(12) United States Patent
Davis et al.

(10) Patent No.: US 10,776,244 B2
(45) Date of Patent: Sep. 15, 2020

(54) CONSOLIDATION PLANNING SERVICES FOR SYSTEMS MIGRATION

(71) Applicant: ORACLE INTERNATIONAL CORPORATION, Redwood Shores, CA (US)

(72) Inventors: George Davis, Wake Forest, NC (US); Valentin N. Popa, Penfield, NY (US)

(73) Assignee: Oracle International Corporation, Redwood Shores, CA (US)

( * ) Notice: Subject to any disclaimer, the term of this patent is extended or adjusted under 35 U.S.C. 154(b) by 714 days.

(21) Appl. No.: 13/938,061

(22) Filed: Jul. 9, 2013

(65) Prior Publication Data

US 2015/0019195 A1    Jan. 15, 2015

(51) Int. Cl.
*G06F 11/34* (2006.01)
*G06F 11/32* (2006.01)

(52) U.S. Cl.
CPC ...... *G06F 11/3447* (2013.01); *G06F 11/3442* (2013.01); *G06F 11/324* (2013.01); *G06F 2201/815* (2013.01)

(58) Field of Classification Search
CPC ............. G06F 11/3447; G06F 11/3442; G06F 11/324; G06F 17/303; G06F 9/5088; G06F 9/505; G06F 2201/815; G06F 2206/1012; G06F 3/0647; G06F 9/50
See application file for complete search history.

(56) References Cited

U.S. PATENT DOCUMENTS

| | | |
|---|---|---|
| 6,016,394 A | 1/2000 | Walker |
| 6,185,625 B1 | 2/2001 | Tso et al. |
| 6,477,483 B1 * | 11/2002 | Scarlat ............... G06F 11/3414 |
| | | 702/186 |
| 6,604,110 B1 | 8/2003 | Savage et al. |
| 6,615,220 B1 * | 9/2003 | Austin ............. G06F 17/30569 |
| 6,738,811 B1 | 5/2004 | Liang |

(Continued)

FOREIGN PATENT DOCUMENTS

| | | |
|---|---|---|
| CN | 1545674 A | 11/2004 |
| CN | 1652087 A | 8/2005 |

(Continued)

OTHER PUBLICATIONS

To et al, Best Practices for Database Consolidation on Exadata Database Machine, Oracle White Paper, Oracle, 2011, 29 pages.*

(Continued)

*Primary Examiner* — Omar F Fernandez Rivas
*Assistant Examiner* — Robert S Brock
(74) *Attorney, Agent, or Firm* — Kilpatrick Townsend & Stockton LLP

(57) ABSTRACT

Systems and methods for modeling a prospective systems migration between server systems are provided. Performance data associated with a plurality of applications in a first server system may be collected. A selection of a set of applications in the plurality of applications to migrate to a second server system may be processed. Combined performance data that estimates how the set of applications will perform on the second server system may be computed using at least some of the performance data. Based on the combined performance data, indications as to whether the set of applications should be migrated to the second server system may be provided.

20 Claims, 18 Drawing Sheets

(56) References Cited

U.S. PATENT DOCUMENTS

| | | | |
|---|---|---|---|
| 6,973,489 B1 | 12/2005 | Levy | |
| 7,065,541 B2 | 6/2006 | Gupta et al. | |
| 7,177,866 B2 | 2/2007 | Holenstein et al. | |
| 7,290,003 B1 | 10/2007 | Tong | |
| 7,343,467 B2 | 3/2008 | Brown et al. | |
| 7,548,898 B1 | 6/2009 | Tarenskeen et al. | |
| 7,580,862 B1 | 8/2009 | Montelo et al. | |
| 7,620,665 B1 | 11/2009 | George et al. | |
| 7,693,983 B1* | 4/2010 | Gupta | H04L 12/1471 709/221 |
| 7,865,584 B2 | 1/2011 | Grossner et al. | |
| 7,886,028 B2 | 2/2011 | Kogoh | |
| 7,913,056 B2 | 3/2011 | Brown et al. | |
| 8,059,565 B2 | 11/2011 | Dholakia et al. | |
| 8,074,107 B2 | 12/2011 | Sivasubramanian et al. | |
| 8,150,811 B1 | 4/2012 | Tarenskeen et al. | |
| 8,175,863 B1* | 5/2012 | Ostermeyer | G06F 17/5009 703/13 |
| 8,271,757 B1 | 9/2012 | Chatterjee et al. | |
| 8,356,010 B2 | 1/2013 | Driesen | |
| 8,484,355 B1 | 7/2013 | Lochhead et al. | |
| 8,584,230 B2* | 11/2013 | Dillaway | G06F 21/6218 726/10 |
| 8,606,894 B1* | 12/2013 | Fremont | G06F 9/5061 709/223 |
| 8,639,989 B1 | 1/2014 | Sorenson, III et al. | |
| 8,924,353 B1 | 12/2014 | Patwardhan et al. | |
| 8,943,032 B1 | 1/2015 | Xu et al. | |
| 9,098,364 B2 | 8/2015 | Davis | |
| 9,176,773 B2* | 11/2015 | Fries | G06F 9/4856 |
| 9,442,983 B2 | 9/2016 | Higginson et al. | |
| 9,479,394 B2 | 10/2016 | Lochhead et al. | |
| 9,491,072 B2 | 11/2016 | Raghunathan et al. | |
| 9,602,599 B2* | 3/2017 | Bhattacharya | H04L 67/1097 |
| 9,626,710 B1* | 4/2017 | Chheda | G06F 9/5027 |
| 9,736,013 B2* | 8/2017 | Markley | H04L 67/34 |
| 9,747,311 B2 | 8/2017 | Buehne et al. | |
| 9,762,461 B2 | 9/2017 | Raghunathan et al. | |
| 9,792,321 B2 | 10/2017 | Buehne et al. | |
| 9,805,070 B2 | 10/2017 | Buehne et al. | |
| 9,811,527 B1 | 11/2017 | Esposito et al. | |
| 9,967,154 B2 | 5/2018 | Masterson et al. | |
| 9,996,562 B2* | 6/2018 | Higginson | G06F 17/303 |
| 10,007,701 B2* | 6/2018 | Subramanian | G06F 17/30507 |
| 10,198,255 B2 | 2/2019 | Higginson et al. | |
| 10,248,671 B2 | 4/2019 | Buehne et al. | |
| 10,540,335 B2 | 1/2020 | Buehne et al. | |
| 2001/0029502 A1 | 10/2001 | Oeda | |
| 2001/0044795 A1 | 11/2001 | Cohen et al. | |
| 2002/0002578 A1 | 1/2002 | Yamashita | |
| 2002/0019826 A1 | 2/2002 | Tan | |
| 2002/0147645 A1 | 10/2002 | Alao et al. | |
| 2002/0177977 A1 | 11/2002 | Scarlat et al. | |
| 2002/0194329 A1 | 12/2002 | Alling | |
| 2002/0198984 A1 | 12/2002 | Goldstein et al. | |
| 2003/0037034 A1 | 2/2003 | Daniels et al. | |
| 2003/0066049 A1 | 4/2003 | Atwood et al. | |
| 2003/0069903 A1 | 4/2003 | Gupta et al. | |
| 2003/0192028 A1 | 10/2003 | Gusler et al. | |
| 2004/0098425 A1 | 5/2004 | Wiss et al. | |
| 2004/0153358 A1 | 8/2004 | Lienhart | |
| 2004/0167840 A1 | 8/2004 | Tully et al. | |
| 2004/0178261 A1 | 9/2004 | Potonniee et al. | |
| 2004/0181790 A1 | 9/2004 | Herrick | |
| 2004/0260875 A1 | 12/2004 | Murotani et al. | |
| 2005/0021567 A1 | 1/2005 | Holenstein et al. | |
| 2005/0055357 A1 | 3/2005 | Campbell | |
| 2005/0055446 A1 | 3/2005 | Chidambaran et al. | |
| 2005/0102318 A1 | 5/2005 | Odhner et al. | |
| 2005/0204241 A1 | 9/2005 | Tamakoshi | |
| 2006/0059253 A1 | 3/2006 | Goodman et al. | |
| 2006/0112247 A1* | 5/2006 | Ramany | G06F 3/0605 711/165 |
| 2006/0156086 A1 | 7/2006 | Flynn et al. | |
| 2006/0173875 A1* | 8/2006 | Stefaniak | H04L 67/1008 |
| 2006/0179171 A1* | 8/2006 | Stefaniak | G06F 9/5061 710/15 |
| 2006/0179431 A1* | 8/2006 | Devanathan | G06F 8/61 717/168 |
| 2006/0235899 A1 | 10/2006 | Tucker | |
| 2006/0282825 A1* | 12/2006 | Taylor | G06F 9/5083 717/127 |
| 2007/0028234 A1 | 2/2007 | Sero et al. | |
| 2007/0067847 A1* | 3/2007 | Wiemer | G06F 21/577 726/25 |
| 2007/0089092 A1 | 4/2007 | Schmidt et al. | |
| 2007/0106710 A1 | 5/2007 | Haustein et al. | |
| 2007/0150488 A1* | 6/2007 | Barsness | G06F 17/303 |
| 2007/0234346 A1 | 10/2007 | Kramer et al. | |
| 2007/0239774 A1 | 10/2007 | Bodily et al. | |
| 2007/0250829 A1 | 10/2007 | Hillier et al. | |
| 2007/0299892 A1 | 12/2007 | Nakahara | |
| 2008/0247320 A1* | 10/2008 | Grah | H04L 41/5012 370/241 |
| 2008/0313595 A1 | 12/2008 | Boulineau et al. | |
| 2009/0012981 A1* | 1/2009 | Kogoh | G06F 8/64 |
| 2009/0070733 A1 | 3/2009 | Huang et al. | |
| 2009/0070771 A1 | 3/2009 | Yuyitung et al. | |
| 2009/0113399 A1 | 4/2009 | Tzoref et al. | |
| 2009/0157864 A1 | 6/2009 | Kim | |
| 2009/0187413 A1 | 7/2009 | Abels et al. | |
| 2009/0210857 A1 | 8/2009 | Martineau | |
| 2009/0238078 A1* | 9/2009 | Robinson | G06Q 10/06 370/241 |
| 2009/0276771 A1 | 11/2009 | Nickolov et al. | |
| 2009/0313311 A1 | 12/2009 | Hoffmann et al. | |
| 2010/0005097 A1* | 1/2010 | Liang | G06F 11/3414 707/E17.032 |
| 2010/0049851 A1 | 2/2010 | Garrison et al. | |
| 2010/0049934 A1* | 2/2010 | Tomita | G06F 3/0613 711/165 |
| 2010/0082543 A1 | 4/2010 | Nagarajan | |
| 2010/0191884 A1 | 7/2010 | Holenstein et al. | |
| 2010/0192156 A1* | 7/2010 | Hollingsworth | G06F 9/5011 718/104 |
| 2010/0198799 A1 | 8/2010 | Krishnan et al. | |
| 2010/0262974 A1* | 10/2010 | Uyeda | G06F 9/4856 718/105 |
| 2011/0022711 A1* | 1/2011 | Cohn | G06F 9/5061 709/225 |
| 2011/0093436 A1 | 4/2011 | Zha et al. | |
| 2011/0107327 A1* | 5/2011 | Barkie | G06F 8/63 717/176 |
| 2011/0161933 A1 | 6/2011 | Hudson | |
| 2011/0173327 A1* | 7/2011 | Chen | G06F 9/5066 709/226 |
| 2011/0251992 A1* | 10/2011 | Bethlehem | H04L 12/2863 707/610 |
| 2012/0017112 A1 | 1/2012 | Broda et al. | |
| 2012/0041933 A1 | 2/2012 | Driesen | |
| 2012/0096134 A1 | 4/2012 | Suit | |
| 2012/0102498 A1 | 4/2012 | Subramanya et al. | |
| 2012/0150642 A1 | 6/2012 | Kandanala et al. | |
| 2012/0158821 A1* | 6/2012 | Barros | G06F 16/254 709/203 |
| 2012/0221845 A1* | 8/2012 | Ferris | H04L 67/1097 713/150 |
| 2012/0254435 A1* | 10/2012 | Zhaofu | G06F 17/30286 709/226 |
| 2012/0265726 A1 | 10/2012 | Padmanabhan et al. | |
| 2012/0284360 A1 | 11/2012 | Bense et al. | |
| 2012/0297016 A1 | 11/2012 | Iyer et al. | |
| 2012/0297059 A1 | 11/2012 | Bross | |
| 2012/0303739 A1* | 11/2012 | Ferris | H04L 67/06 709/217 |
| 2012/0311128 A1 | 12/2012 | Pechanec et al. | |
| 2013/0067298 A1 | 3/2013 | Li et al. | |
| 2013/0085742 A1 | 4/2013 | Barker et al. | |
| 2013/0085989 A1 | 4/2013 | Nayyar et al. | |
| 2013/0086130 A1 | 4/2013 | Wang et al. | |
| 2013/0152050 A1 | 6/2013 | Chang et al. | |
| 2013/0173546 A1 | 7/2013 | Cline et al. | |

(56) References Cited

U.S. PATENT DOCUMENTS

| | | |
|---|---|---|
| 2013/0173547 A1 | 7/2013 | Cline et al. |
| 2013/0211559 A1* | 8/2013 | Lawson ............ G06Q 10/06315 700/83 |
| 2013/0268643 A1* | 10/2013 | Chang ................ G06F 9/45558 709/223 |
| 2013/0268799 A1* | 10/2013 | Mestery ................ H04L 67/10 714/4.2 |
| 2013/0268800 A1 | 10/2013 | Rangaiah |
| 2013/0283364 A1* | 10/2013 | Chang .................... H04L 49/70 726/12 |
| 2013/0297802 A1 | 11/2013 | Laribi et al. |
| 2013/0311968 A1 | 11/2013 | Sharma |
| 2013/0326028 A1* | 12/2013 | Cox ...................... G06F 9/4856 709/220 |
| 2014/0007216 A1 | 1/2014 | Ahn |
| 2014/0019961 A1* | 1/2014 | Neuse .................. G06F 9/5088 718/1 |
| 2014/0059559 A1* | 2/2014 | Alatorre .................... G06F 9/50 718/104 |
| 2014/0068071 A1* | 3/2014 | Fremont ............... G06F 9/5061 709/224 |
| 2014/0075031 A1 | 3/2014 | Doering et al. |
| 2014/0075033 A1 | 3/2014 | Doering et al. |
| 2014/0089495 A1 | 3/2014 | Akolkar et al. |
| 2014/0089809 A1 | 3/2014 | Levy et al. |
| 2014/0109053 A1 | 4/2014 | Vasudevan et al. |
| 2014/0129690 A1 | 5/2014 | Jaisinghani et al. |
| 2014/0136711 A1 | 5/2014 | Benari et al. |
| 2014/0172782 A1 | 6/2014 | Schuenzel et al. |
| 2014/0195636 A1 | 7/2014 | Karve et al. |
| 2014/0215045 A1* | 7/2014 | Wang .................. H04L 41/0816 709/223 |
| 2014/0279890 A1 | 9/2014 | Srinivasan et al. |
| 2014/0337429 A1 | 11/2014 | Asenjo et al. |
| 2014/0344439 A1 | 11/2014 | Kempf et al. |
| 2014/0373011 A1 | 12/2014 | Anderson et al. |
| 2015/0019195 A1 | 1/2015 | Davis |
| 2015/0019197 A1 | 1/2015 | Higginson et al. |
| 2015/0019478 A1 | 1/2015 | Buehne et al. |
| 2015/0019479 A1* | 1/2015 | Buehne .................. G06F 16/214 707/609 |
| 2015/0019487 A1 | 1/2015 | Buehne et al. |
| 2015/0019488 A1 | 1/2015 | Higginson et al. |
| 2015/0019564 A1 | 1/2015 | Higginson et al. |
| 2015/0019700 A1 | 1/2015 | Masterson et al. |
| 2015/0019706 A1 | 1/2015 | Raghunathan et al. |
| 2015/0019707 A1 | 1/2015 | Raghunathan et al. |
| 2015/0020059 A1 | 1/2015 | Davis |
| 2015/0058467 A1 | 2/2015 | Douglas et al. |
| 2015/0096011 A1* | 4/2015 | Watt .................... H04L 63/0272 726/15 |
| 2015/0264128 A1* | 9/2015 | Huang ................ H04L 67/1014 709/203 |
| 2015/0355947 A1 | 12/2015 | Polkovnikov |
| 2015/0358392 A1 | 12/2015 | Ramalingam et al. |
| 2015/0363396 A1 | 12/2015 | Sengupta et al. |
| 2016/0269371 A1* | 9/2016 | Coimbatore ........ H04L 63/0471 |
| 2016/0364229 A1 | 12/2016 | Higginson et al. |
| 2017/0075709 A1* | 3/2017 | Feng .................. G06F 9/45558 |
| 2017/0278012 A1 | 9/2017 | Prasad et al. |
| 2017/0337193 A1 | 11/2017 | Buehne et al. |
| 2017/0351716 A1 | 12/2017 | Higginson et al. |
| 2018/0060313 A1 | 3/2018 | Buehne et al. |
| 2018/0157653 A1 | 6/2018 | Wadhwa et al. |
| 2018/0285353 A1 | 10/2018 | Ramohalli Gopala Rao et al. |

FOREIGN PATENT DOCUMENTS

| | | |
|---|---|---|
| CN | 1734421 A | 2/2006 |
| CN | 1955965 | 5/2007 |
| CN | 101084481 | 12/2007 |
| CN | 101204042 A | 6/2008 |
| CN | 101266606 | 9/2008 |
| CN | 101322113 A | 12/2008 |
| CN | 101473594 | 7/2009 |
| CN | 102656565 A | 9/2010 |
| CN | 101919205 A | 12/2010 |
| CN | 102662757 | 9/2012 |
| CN | 102982085 | 3/2013 |
| CN | 103109271 | 5/2013 |
| CN | 103176988 | 6/2013 |
| CN | 103297492 A | 9/2013 |
| CN | 103530290 | 1/2014 |
| CN | 105308577 A | 2/2016 |
| CN | 105324756 A | 2/2016 |
| CN | 105324769 A | 2/2016 |
| CN | 105359102 A | 2/2016 |
| CN | 105359146 A | 2/2016 |
| CN | 105393250 A | 3/2016 |
| CN | 105556515 | 5/2016 |
| CN | 105580032 | 5/2016 |
| CN | 105580032 | 11/2017 |
| CN | 105308577 | 1/2018 |
| CN | 107729252 | 2/2018 |
| CN | 105324756 | 6/2019 |
| CN | 105324769 | 6/2019 |
| CN | 105359146 | 7/2019 |
| CN | 105393250 | 7/2019 |
| CN | 105359147 | 8/2019 |
| EP | 1611532 A4 | 10/2008 |
| EP | 2418591 | 2/2012 |
| EP | 3019958 | 5/2016 |
| EP | 3019961 | 5/2016 |
| EP | 3019962 | 5/2016 |
| EP | 3019975 | 5/2016 |
| EP | 3019976 | 5/2016 |
| EP | 3019979 | 5/2016 |
| EP | 3019980 | 5/2016 |
| EP | 3019981 | 5/2016 |
| EP | 3020010 | 5/2016 |
| EP | 3019961 | 3/2018 |
| EP | 3019962 | 3/2020 |
| GB | 2466742 | 9/2010 |
| JP | 2006277153 | 10/2006 |
| WO | 9952047 | 10/1999 |
| WO | 0153949 | 7/2001 |
| WO | 2010030489 | 3/2010 |
| WO | 2012047757 | 4/2012 |
| WO | 2013072925 | 5/2013 |
| WO | 2014032262 | 3/2014 |
| WO | 2015/005991 | 1/2015 |
| WO | 2015/005994 | 1/2015 |
| WO | 2015/006124 | 1/2015 |
| WO | 2015/006129 | 1/2015 |
| WO | 2015/006132 | 1/2015 |
| WO | 2015/006137 | 1/2015 |
| WO | 2015/006138 | 1/2015 |
| WO | 2015/006308 | 1/2015 |
| WO | 2015/006358 | 1/2015 |
| WO | 2015191119 A1 | 12/2015 |
| WO | 105359147 A | 2/2016 |
| WO | 2017/213803 A1 | 12/2017 |

OTHER PUBLICATIONS

Vengurlekar et al, Best Practices for Database Consolidation in Private Clouds, Oracle White Paper, Oracle, Mar. 2012, 20 pages.*

Chanchary et al., Data Migration: Connecting Databases in the Cloud, ICCIT 2012, Saudi Arabia, retrieved from the Internet: <URL:http://www.chinacloud.cn/upload/2012-03/12033108076850.pdf>, Jun. 28, 2012, pp. 450-455.

Leite et al., Migratool: Towards a Web-Based Spatial Database Migration Tool, IEEE Computer Society, Proceedings of the 16th International Workshop on Database and Expert Systems Applications, Aug. 22, 2005, pp. 480-484.

Tao et al., Intelligent database placement in cloud environment, Web Services (ICWS), 2012 IEEE 19th International Conference, IEEE Computer Society, Jun. 24, 2012, pp. 544-551.

International Application No. PCT/US2014/045226, International Search Report and Written Opinion dated Oct. 30, 2014, 10 pages.

(56) References Cited

OTHER PUBLICATIONS

International Application No. PCT/US2014/045240, International Search Report and Written Opinion dated Oct. 21, 2014, 10 pages.
International Application No. PCT/US2014/045289, International Search Report and Written Opinion dated Oct. 15, 2014, 9 pages.
International Application No. PCT/US2014/045721, International Search Report and Written Opinion dated Nov. 4, 2014, 12 pages.
International Application No. PCT/US2014/045804, International Search Report and Written Opinion dated Nov. 17, 2014, 12 pages.
International Application No. PCT/US2014/040486, Written Opinion dated Jun. 17, 2015, 7 pages.
International Application No. PCT/US2014/040692, Written Opinion dated Jul. 16, 2015, 7 pages.
International Preliminary Report on Patentability of PCT/US2014/045247 dated Jan. 21, 2016, all pages.
International Preliminary Report on Patentability of PCT/US2014/045804 dated Jan. 21, 2016, all pages.
International Preliminary Report on Patentability of PCT/US2014/045721 dated Jan. 21, 2016, all pages.
International Preliminary Report on Patentability of PCT/US2014/045282 dated Jan. 21, 2016, all pages.
International Preliminary Report on Patentability of PCT/US2014/045289 dated Jan. 21, 2016, all pages.
International Preliminary Report on Patentability of PCT/US2014/045240 dated Jan. 21, 2016, all pages.
Notification of Transmittal of the International Preliminary Report on Patentability of PCT/US2014/040486 dated Oct. 1, 2015, all pages.
Notification of Transmittal of the International Preliminary Report on Patentability of PCT/US2014/040692 dated Oct. 8, 2015, all pages.
International Preliminary Report on Patentability of PCT/US2014/045226 dated Jan. 21, 2016, all pages.
Baysal, et al., "A Bug You Like: A Framework for Automated Assignment of Bugs", 2009.
Charles, Bug Severity vs. Priority, Quality Intelligence Blog, Retrieved on Aug. 4, 2014, from http://quality-intelligence.blogspot.com/2010/08/bug-severity-vs-priority.html, Aug. 22, 2010, 6 pages.
Das et al., Albatross: Lightweight elasticity in shared storage databases for the cloud using live data migration, 37th International Conference on Very Large Data Bases, Proceedings of the VLDB Endowment, vol. 4, No. 8, Retrieved from the Internet:URL:http://www.cs.ucsb.eduj-sudiptojpapers/albatross.pdf, Aug. 29, 2011 12 pages.
International Application No. PCT/US2014/040486, International Search Report and Written Opinion dated Sep. 29, 2014, 11 pages.
International Application No. PCT/US2014/040692, International Search Report and Written Opinion dated Oct. 8, 2014, 8 pages.
International Application No. PCT/US2014/045247, International Search Report and Written Opinion dated Sep. 3, 2014, 8 pages.
International Application No. PCT/US2014/045282, International Search Report and Written Opinion dated Sep. 18, 2014, 12 pages.
U.S. Appl. No. 13/937,483, Notice of Allowance dated Jan. 20, 2017, 8 pages.
U.S. Appl. No. 13/937,545, Non-Final Office Action dated Feb. 7, 2017, 19 pages.
European Application No. 14745014.2, Office Action dated Jan. 18, 2017, 8 pages.
U.S. Appl. No. 13/937,344, Final Office Action dated Feb. 11, 2016, 12 pages.
U.S. Appl. No. 13/937,344, Non-Final Office Action dated Sep. 24, 2015, 11 pages.
U.S. Appl. No. 13/937,344, Notice of Allowance dated May 4, 2016, 11 pages.
U.S. Appl. No. 13/937,344, Notice of Allowance dated Oct. 11, 2016, 2 pages.
U.S. Appl. No, 13/937,344, Notice of Allowance dated Jun. 6, 2016, 5 pages.
U.S. Appl. No. 13/937,483, Advisory Action dated May 12, 2016, 3 pages.
U.S. Appl. No. 13/937,483, Final Office Action dated Feb. 26, 2016, 13 pages.
U.S. Appl. No. 13/937,483, Non-Final Office Action dated Sep. 25, 2015, 13 pages.
U.S. Appl. No. 131937,486, Non-Final Office Action dated Jan. 11, 2016, 14 pages.
U.S. Appl. No. 13/937,486, Non-Final Office Action dated Nov. 4, 2016, 20 pages.
U.S. Appl. No. 13/937,545, Final Office Action dated May 13, 2016, 20 pages.
U.S. Appl. No. 13/937,545, Non-Final Office Action dated Nov. 10, 2015, 19 pages.
U.S. Appl. No. 13/937,868, Final Office Action dated Apr. 22, 2016, 23 pages.
U.S. Appl. No. 13/937,868, Non-Final Office Action dated Nov. 4, 2015, 18 pages.
U.S. Appl. No. 13/937,970, Final Office Action dated Dec. 10, 2015, 18 pages.
U.S. Appl. No. 13/937,970, Non-Final Office Action dated May 5, 2015, 17 pages.
U.S. Appl. No. 13/937,970, Non-Final Office Action dated May 12, 2016, 23 pages.
U.S. Appl. No. 13/937,970, Final Office Action dated Dec. 1, 2016, 22 pages.
U.S. Appl. No. 13/937,977, Final Office Action dated Feb. 26, 2015, 30 pages.
U.S. Appl. No. 13/937,977, Non-Final Office Action dated Aug. 12, 2014, 28 pages.
U.S. Appl. No. 13/937,977, Non-Final Office Action dated Aug. 19, 2015, 34 pages.
U.S. Appl. No. 13/937,977, Notice of Allowance dated Mar. 16, 2016, 18 pages.
U.S. Appl. No. 13/938,066, Corrected Notice of Allowability dated Jun. 2, 2015, 2 pages.
U.S. Appl. No. 13/938,065, Non-Final Office Action dated Dec. 17, 2014, 19 pages.
U.S. Appl. No. 13/938,066, Notice of Allowance dated Apr. 29, 2015, 15 pages.
U.S. Appl. No. 13/937,344, Corrected Notice of Allowability dated Sep. 15, 2016, 2 pages.
U.S. Appl. No. 13/937,483, Non-Final Office Action dated Aug. 12, 2016, 13 pages.
U.S. Appl. No. 13/937,486, Final Office Action dated Jul. 28, 2016, 18 pages.
U.S. Appl. No. 13/937,885, Non-Final Office Action dated Aug. 18, 2016, 32 pages.
U.S. Appl. No. 13/937,977, Corrected Notice of Allowability dated Jul. 16, 2016, 2 pages.
U.S. Appl. No. 13/937,988, Non-Final Office Action dated Sep. 1, 2016, 10 pages.
Notice of Allowance dated May 3, 2017 for U.S. Appl. No. 13/937,483, filed Jul. 9, 2013, 5 pages.
Notice of Allowance dated Jun. 16, 2017 for U.S. Appl. No. 13/937,486, filed Jul. 9, 2013, 5 pages.
Notice of Allowance dated Jun. 15, 2017 for U.S. Appl. No. 13/937,545, filed Jul. 9, 2013, 10 pages.
Non-Final Office Action dated Apr. 5, 2017 for U.S. Appl. No. 13/937,868, filed Jul. 9, 2013, 23 pages.
Final Office Action dated May 19, 2017 for U.S. Appl. No. 13/937,885, filed Jul. 9, 2013, 22 pages.
Advisory Action dated Apr. 13, 2017 for U.S. Appl. No. 13/937,970, filed Jul. 9, 2013, 3 pages.
Non-Final Office Action dated Jun. 26, 2017 for U.S. Appl. No. 13/937,970, filed Jul. 9, 2013, 31 pages.
Notice of Allowance dated Apr. 27, 2017 for U.S. Appl. No. 13/937,988, filed Jul. 9, 2013, 8 pages.
Office Action dated Feb. 27, 2017 for Chinese Patent Application CN201480035255.X filed Jul. 2, 2014, 11 pages.
Office Action dated Apr. 6, 2017 for Chinese Patent Application CN201480035257.9 filed Jul. 2, 2014, 10 pages.
Office Action dated Apr. 5, 2017 for European Patent Application EP14745014.2 filed Jul. 2, 2014, 33 pages.

(56) References Cited

OTHER PUBLICATIONS

Wilton, Jeremiah: "A look at Real Application Testing from a customer's perspective", Jan. 1, 2007 (Jan. 1, 2007), XP055357904, Retrieved from the Internet: URL:http://www.oracle.com/technetwork/oem/grid-control/overview/ratcust-perspectives-white-paper-o-132919.pdf [retrieved on Mar. 23, 2017].
U.S. Appl. No. 13/397,970, filed Jul. 9, 2013 received an Applicant-Initiated Interview Summary, dated Oct. 5, 2017, 3 pages.
U.S. Appl. No. 13/937,868, filed Jul. 9, 2013 received a Final Office Action dated Oct. 27, 2017, 25 pages.
CN Application No. 201480035257.9 filed Jul. 2, 2014 received a Notice of Decision to Grant dated Oct. 11, 2017, 4 pages.
EP14745015.9 received an Office Action dated May 14, 2018, 5 pages.
EP14745013.4 received an Office Action dated Apr. 30, 2018. 6 pages.
U.S. Appl. No. 13/937,868, Notice of Allowance dated Feb. 8, 2018, 10 pages.
U.S. Appl. No. 13/937,970, Supplemental Notice of Allowance dated Jan. 19, 2018, 6 pages.
U.S. Appl. No. 15/250,522, Non-Final Office Action dated Mar. 1, 2018, 15 pages.
U.S. Appl. No. 15/789,049, Non-Final Office Action dated Feb. 2, 2018, 14 pages.
European Application No. 14745014.2, Notice of Decision to Grant dated Feb. 22, 2018, 2 pages.
Liang et al., Automatic Construction of an Effective Training Set for Prioritizing Static Analysis Warnings, ASE '10 Proceedings of the IEEE/ACM international conference on Automated software engineering, Sep. 20-24, 2010, pp. 93-102.
Miller, How to Score Customer Feedback/Bugs and Stores (for Agile), Configuration Management, May 17, 2013.
U.S. Appl. No. 13/937,970 received a Notice of Allowance dated Dec. 28, 2017, 9 pages.
CN201480035259.8 received an Office Action, dated Nov. 14, 2017, 17 pages.
Notice of Decision to Grant, dated Aug. 29, 2017 in Chinese Application No. 201480035255.X all pages.
International Search Report and Written Opinion of PCT/US2017/032620 dated Jul. 28, 2017, 13 pages.
U.S. Appl. No. 13/937,885, Non-Final Office Action datd Aug. 10, 2018, 23 pages.
U.S. Appl. No. 15/250,522, Notice of Allowance dated Aug. 14, 2018, 10 pages.
Buyukozkan et al., Group Decision Making to Better Respond Customer Needs in Software Development, Computer & Industrial Engineering, vol. 48, Issue 2, Mar. 2005, pp. 427-441.
Laplante et al., Pavlov's Bugs Matching Repair Policies with Rewards, IEEE, vol. 11, Issue 4, Jul.-Aug. 2009, pp. 45-51.
Sharma et al., Predicting the Priority of a Reported Bug Using Machine Learning Techniques and Cross Project Validation, IEEE, 12th International Conference on Intelligent Systems Design and Applications, Nov. 2012, pp. 539-545.
Chinese Application No. 201480035250.7, Office Action dated Jul. 5, 2018, (6 pages of original document and 6 pages of English translation).
Chinese Application No. 201480039073.X, Office Action dated Jul. 17, 2018, (12 pages of original document and 14 pages of English translation).
Chinese Application No. 201480039080.X, Office Action dated Jul. 5, 2018, (8 pages of original document and 11 pages of English translation).
Chinese Application No. 201480039083.3, Office Action dated Jul. 10, 2018, (15 pages of original document and 15 pages of English translation).
CN201480035349.7, Office Action dated Aug. 3, 2018, 14 pages.
U.S. Appl. No. 15/250,522 received a Corrected Notice of Allowability, dated Sep. 27, 2018, 2 pages.
U.S. Appl. No. 15/789,049 received a Final Office Action, dated Sep. 6, 2018, 6 pages.
CN201480039070.6 received an Office Action dated Aug. 6, 2016, 21 pages.
EP14736122.4 received a Notice of Decision to Grant dated Aug. 17, 2016, 2 pages.
EP18187354.8, received an Extended European Search Report dated Sep. 12, 2018, 6 pages.
CN201480035259.8 received an office action dated Jun. 14, 2018, 19 pages.
U.S. Appl. No. 15/175,213 received a Non-Final Office Action dated Jul. 11, 2018, 35 pages.
U.S. Appl. No. 15/175,213, Final Office Action dated Jan. 10, 2019, 33 pages.
U.S. Appl. No. 15/250,522, Corrected Notice of Allowability dated Jan. 11, 2019, 3 pages.
EP14744404 filed Feb. 7, 2014, Examination Report dated Oct. 15, 2018, 5 pages.
CN201480035259.8, Office Action dated Dec. 3, 2018, 15 pages.
CN201480039073.X, Office Action dated Dec. 10, 2018, 6 pages.
CN201480039083.3, Office Action dated Dec. 10, 2018, 6 pages.
EP14745029.0, Office Action dated Sep. 18, 2018, all pages.
PCT/US2017/032620, Internationai Preliminary Report on Patentability dated Dec. 20, 2018, 10 pages.
U.S. Appl. No. 15/670,473, Non-Final Office Action dated Dec. 18, 2018, 12 pages.
U.S. Appl. No. 15/789,049, Notice of Allowance dated Nov. 15, 2018, 5 pages.
Chinese Application No. 201480039070.6, Office Action dated Jan. 14, 2019, 25 pages (10 pages of the original document and 15 pages of the English translation).
European Application No. 14745028.2, Office Action dated Feb. 13, 2019, 6 pages.
European Application No. EP17726064.3, Office Action dated Apr. 2, 2020, 9 pages.
CN Patent Application No. CN201480039070.6, Office Action dated Jul. 24, 2019, 20 pages.
U.S. Appl. No. 13/937,885, Advisory Action dated Jul. 31, 2019, 17 pages.
Chinese Application No. 201480035349.7, Office Action dated Sep. 4, 2019, 8 pages (3 pages of Original Document and 5 pages of English Translation).
U.S. Appl. No. 15/175,213, Non-Final Office Action dated Sep. 19, 2019, 33 pages.
U.S. Appl. No. 15/670,473, Notice of Allowance dated Sep. 18, 2019, 8 pages.
U.S. Appl. No. 16/003,557, Non-Final Office Action dated Sep. 5, 2019, 9 pages.
Chinese Application No. 201480035250.7, Notice of Decision to Grant dated Mar. 7, 2019, 2 pages.
Chinese Application No. 201480035259.8, Notice of Decision to Grant dated Apr. 2, 2019, 2 pages.
Chinese Application No. 201480035349.7, Office Action dated Apr. 10, 2019, 7 pages (3 pages of Original Document and 4 pages of English Translation).
Chinese Application No. 201480039070.6, Office Action dated Mar. 26, 2019, 21 pages (9 pages of Original Document and 12 pages of English Translation).
Chinese Application No. 201480039073.X, Notice of Decision to Grant dated Mar. 26, 2019, 2 pages.
Chinese Application No. 201480039080.X, Notice of Decision to Grant dated May 9, 2019, 2 pages.
Chinese Application No. 201480039083.3, Notice of Decision to Grant dated Apr. 17, 2019, 2 pages.
European Application No. 14745012.6, Office Action dated Mar. 5, 2019, 4 pages.
European Application No. 14745015.9, Summons to Attend Oral Proceedings dated Jan. 25, 2019, 6 pages.
European Application No. 14745029.0, Summons to Attend Oral Proceedings dated Apr. 25, 2019, 12 pages.
U.S. Appl. No. 13/937,885, Final Office Action dated Mar. 21, 2019, 23 pages.
U.S. Appl. No. 15/670,473, Final Office Action dated Jun. 6, 2019, 12 pages.

(56) References Cited

OTHER PUBLICATIONS

Chinese Application No. 201480039070.6, Office Action dated Jan. 10, 2020, 14 pages (6 pages of Original Document and 8 pages of English Translation).
U.S. Appl. No. 15/175,213, Final Office Action dated Feb. 6, 2020, 30 pages.

* cited by examiner

CONSOLIDATION PLANNING SERVICES FOR SYSTEMS MIGRATION

CROSS-REFERENCES TO RELATED APPLICATIONS

The present application is related to the following co-pending and commonly assigned U.S. Patent Applications: U.S. patent application Ser. No. 13/937,977, filed Jul. 9, 2013, entitled "METHOD AND SYSTEM FOR REDUCING INSTABILITY WHEN UPGRADING SOFTWARE;" U.S. patent application Ser. No. 13/938,066, filed Jul. 9, 2013, and entitled "MIGRATION SERVICES FOR SYSTEMS;" U.S. patent application Ser. No. 13/937,885, filed Jul. 9, 2013, and entitled "DATABASE MODELING AND ANALYSIS;" U.S. patent application Ser. No. 13/937,868, filed Jul. 9, 2013, and entitled "AUTOMATED DATABASE MIGRATION ARCHITECTURE;" U.S. patent application Ser. No. 13/937,344, filed Jul. 9, 2013, and entitled "CLOUD SERVICES LOAD TESTING AND ANALYSIS;" U.S. patent application Ser. No. 13/937,483, filed Jul. 9, 2013, and entitled "CLOUD SERVICES PERFORMANCE TUNING AND BENCHMARKING;" U.S. patent application Ser. No. 13/937,988, filed Jul. 9, 2013, and entitled "SOLUTION TO GENERATE A SCRIPTSET FOR AN AUTOMATED DATABASE MIGRATION;" U.S. patent application Ser. No. 13/937,545, filed Jul. 9, 2013, and entitled "ONLINE DATABASE MIGRATION;" U.S. patent application Ser. No. 13/937,486, filed Jul. 9, 2013, and entitled "DYNAMIC MIGRATION SCRIPT MANAGEMENT;" and U.S. patent application Ser. No. 13/937,970, filed Jul. 9, 2013, and entitled "ADVANCED CUSTOMER SUPPORT SERVICES ADVANCED SUPPORT CLOUD PORTAL." The entire disclosure of the above listed applications are incorporated by reference into this application in their entirety and for all purposes.

BACKGROUND

The present disclosure relates in general to managing networked resources, and, more specifically, but not by way of limitation, to systems and methods of modeling of systems in view of migration.

Modern systems such as, for example, databases, operating systems, applications, and/or the like, are very complex, comprised of numerous components. Managing the systems, diagnosing problems, updating software, and installing new components may therefore be a very involved and complicated task. As a result, system administrator may spend considerable time determining problems, upgrading software, and installing new components. In many cases, specialists or specially trained technicians and administrators may be needed on site to perform the more complicated and specialized tasks.

The necessity to use specially trained technicians and administrators may increase costs and/or increase delays and uncertainty of maintaining and operating the systems. It may often take days or even weeks for a technician or administrator trained to be available to come to a specific site to upgrade software or diagnose a problem. The cost of travel, time, and time investment for the technician or administrator to understand the system and components before the work may begin may further add to the time delay and costs.

Therefore what is needed are improved methods and systems for providing services for modeling systems in view of migration.

BRIEF SUMMARY

In one aspect, a method for modeling a prospective systems migration between server systems is provided. Performance data associated with a plurality of applications in a first server system may be collected. A selection of a set of applications in the plurality of applications to migrate to a second server system may be processed. Combined performance data that estimates how the set of applications will perform on the second server system may be computed using at least some of the performance data. Based on the combined performance data, indications as to whether the set of applications should be migrated to the second server system may be provided.

In another aspect, a non-transitory computer-readable storage medium having stored thereon instructions for modeling a prospective systems migration between server systems is provided. The instructions, when executed by one or more processors, may cause the one or more processors to perform one or more of the following. Performance data associated with a plurality of applications in a first server system may be collected. A selection of a set of applications in the plurality of applications to migrate to a second server system may be processed. Combined performance data that estimates how the set of applications will perform on the second server system may be computed using at least some of the performance data. Based on the combined performance data, indications as to whether the set of applications should be migrated to the second server system may be provided.

In yet another aspect, a system for modeling a prospective systems migration between server systems is provided. One or more processors may be coupled to one or more network interfaces. The one or more processors may to execute instructions to perform one or more of the following. Performance data associated with a plurality of applications in a first server system may be collected. A selection of a set of applications in the plurality of applications to migrate to a second server system may be processed. Combined performance data that estimates how the set of applications will perform on the second server system may be computed using at least some of the performance data. Based on the combined performance data, indications as to whether the set of applications should be migrated to the second server system may be provided.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
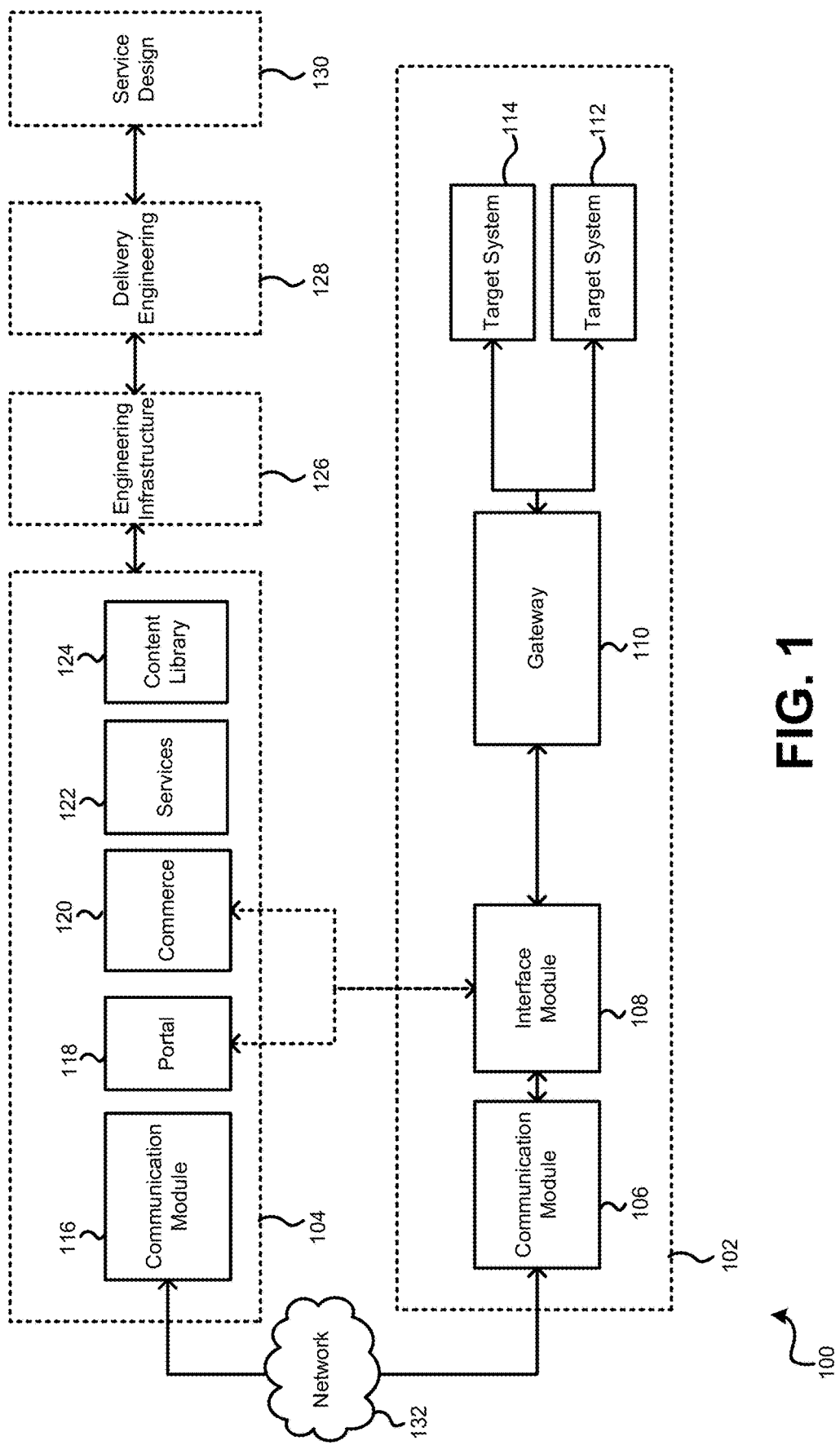
FIG. 1 illustrates an embodiment of a support platform system.

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment of the disclosure. It should be understood that various changes may be made in the function and arrangement of elements without departing from the spirit and scope of the disclosure as set forth in the appended claims.

Specific details are given in the following description to provide a thorough understanding of the embodiments. However, it will be understood by one of ordinary skill in the art that the embodiments maybe practiced without these specific details. For example without limitation, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" includes, but is not limited to portable or fixed storage devices, optical storage devices, wireless channels and various other mediums capable of storing, containing or carrying instruction(s) and/or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Certain embodiments according to the present disclosure may provide customers with legacy systems, such as, for example, databases, operating systems, applications, and/or the like, with effective migration planning and execution from non-cloud technologies to a cloud (e.g., a private cloud). Certain embodiments may provide a cloud migration service, including a migration engine, that provides an automated and validated approach to such migration. Such an approach may allow a customer to meet their Recovery Time Objective (RTO). Certain embodiments may create, test and document a migration strategy by executing a method that will reduce migration time and errors associated with migration that would otherwise impact the customer. Certain embodiments may successfully, efficiently, and automatically migrate legacy system(s) to a cloud within an allotted customer outage window.

Legacy systems may require administration such as periodic maintenance, software upgrades, migration, service deployment, diagnostics, performance tuning, and/or other services. Some organizations and businesses may employ system administrators or other personnel to perform some of these tasks. In some cases, some tasks may require special skills or knowledge outside the scope of a typical administrator and may require an outside expert or personnel to accomplish the tasks. In some cases, the administration tasks may be performed by an outside entity or engineer as a service to the organization or business. And, traditionally, services are provided based on multiple engagements with customer contacts, and creating a contract and service delivery plan tailored to the customer's needs. Service delivery itself is traditionally provided onsite and based on the specific knowledge and/or software the service engineer has access to and may differ from engineer to engineer.

Many of the administrative tasks and services associated with systems may be simplified and streamlined with a platform architecture that supports remote administration, development, and deployment of services. A system may be configured with a support cloud platform to allow automation of tasks and services, and reuse of components. The platform may be used to generate, store, deploy, execute, and track services through their complete life cycle. Services may be designed, made available for deployment, deployed to a customer, and monitored using the platform.

The platform may include a remote portal from which customers, administrators, and service provider may monitor, deploy, and analyze services for a remote customer's target system. The administration may be performed and controlled remotely and at least in part automatically. Services may be controlled and deployed to the target system using the portal eliminating the need for an administrator to be local to the target system. Likewise, the portal provides a rich set of tools for all customers and depends less on the individual skill and knowledge of the particular engineer performing service.

The support cloud platform may facilitate performing services in at least a partially automated and remote manner and may result in a number of important benefits to the service provider and the customer. For example, the platform may reduce the time to market for new services. A unified platform which enables services to be built using common features/components may reduce the time to develop and test the new service. Automation and consistency may allow the service provider to create a standard pricing and contracting model that can be re-used for new services. Sales and contracting time for new services may be reduced due the simplified pricing model. A service provider may create a modular service portfolio and can deliver services discretely or as part of a solution. The platform may reduce the cost of developing and delivering services. A common platform for all services may enable service designers and developers to leverage common features. As developers create more automated services, this reduces/eliminates the need for manual input, thus reducing the cost of delivering a service. The platform may provide for an improvement in global service quality and consistency since services may be designed, developed and delivered through the platform in at least a partially automated manner. The platform may also expand the market for services enabling services to be easily sold and delivered.

In some embodiments, the support cloud platform may be used for the development and deployment of services including assessment services assessing infrastructure, business data, and/or transactions of legacy systems. The services may leverage analytics to identify key indicators, patterns, and/or trends. Services may install, monitor, and/or perform setup of new software and/or hardware. Services may install and implement gold images or perform migrations, upgrades, and consolidations. In addition services may include provisioning, cloning, backup and recovery, install, setup, test, monitoring, recovery and restore, metering, chargeback, testing, load testing, functional testing, performance management and tuning, and/or the like. In some embodiments the services may leverage one service as a basis for other services. Details of some of the services may be found in the above cross-referenced U.S. patent applications.

Certain embodiments may provide for cloud modeling, including analytics, for systems and system components. Modeling according to various embodiments may concern any number of systems, subsystems, and/or system components, such as any one or combination of server(s), OS(s), mid-tier component(s), application(s), database(es), and/or the like. Cloud consolidation planning services for systems according to certain embodiments may include cloud modeling and may ensure that systems are properly modeled and sized for a customer's migration, consolidation, upgrade, patching process, and/or the like. Cloud modeling may allow for improved prediction of the size and workload of a cloud system by analysis of the source environments in view of transition to the cloud. Cloud consolidation planning services for systems may analyze and model key system areas such as system footprint, topology, performance and space trends, and configuration to a 'future state' environment, enabling more accurate planning of the transition. With certain embodiments, customer's business objectives for transitioning to the cloud may be gathered and factored into the analysis. Subject information of modeling according to various embodiments may include one or more customer configuration standards, hardware versions, software versions, workloads/applications (particularly, but not limited to, the most critical), platinum delta patches, platinum delta configuration, configuration settings, recommended changes for optimal placement, business drivers and release cycles, Service Level Agreements (SLAs), storage and compute requirements, and/or the like.

Cloud modeling may include a scenario-based modeling service. Scenarios may include but are not limited to any one or combination of tech refresh, database consolidation, data center optimization, and/or workload rationalization. This service may help customers achieve optimal performance and utilization across their datacenter environment and facilitate transformation into a cloud infrastructure. Certain embodiments may provide the features to make any consolidation seamless and manageable. Certain embodiments may provide proactive management and optimization of systems performance.

Certain embodiments may perform workload mapping to achieve an efficient and cost-effective use of a targeted migration environment without reducing existing capabilities which are key to the customer's business. In some embodiments, cloud consolidation planning services for systems may be executed prior to a system or systems undergoing a significant change, such upgrade, migration, consolidation, patching, configuration/capacity change, and/or the like. The modeling could be performed against test, development, and production environments in a non-disruptive fashion. The modeling may be designed to be pre-emptive, in that modeling services may be performed prior to any change. One benefit of the pre-emptive approach may be that issues/sizing are identified and resolved/implemented "upstream" in the modeling phase are less expensive than to resolve/implement "downstream" in the migration phase of a system's transformational lifecycle.

Some embodiments of cloud consolidation planning services for systems may include features for capturing a production workload measurement and recording it as a point-in-time baseline. A captured production workload may be mapped to a destination environment on a newer, more efficient server hardware platform. Whilst performing the workload comparison on development, test or production systems, certain embodiments may also capture future growth, storage, and annotation data for a more granular and accurate analysis. Certain embodiments may provide the ability to model and size identified systems into a grouping of similar system characteristics based on behaviors, configurations and footprints. For instance, certain embodiments may capture, model, and identify to the customer which groupings of databases, can coexist based on behaviors, configurations and footprints.

Findings and prioritized recommendations may result from cloud modeling. By way of example without limitation, a mapping feature may provide for virtual versus physical mapping based on the types of systems, databases, business units, operational constraints, etc. A detailed description and comparison of workloads grouped by application may be generated. One application may have multiple servers listed below it. Servers may be listed as standalone, clustered or load balanced. Mapping these servers as virtual instances across a single frame or multiple frames could be a key recommendation. Further analysis may include business unit, order of priority, and revenue impact of a system.

As another example, the modeling may provide an identification of system configurations, including which systems cannot be relocated until they are updated via patches or by upgrading and which systems cannot be relocated at all due to business constraints. Which operating environments are compatible may be identified, as well as any rules governing the compatibility matrices associated with the source environments. Consolidation options for systems may be identified. Also, for example, with systems and other key performance data in the environment being reviewed, the modeling may identify resource bottlenecks and/or areas for optimization (e.g., based on production load captured). In some embodiments, the modeling may include running scripts to identify a platinum delta (i.e., a deviation from an optimal configuration) and present a report regarding the results. As yet another example, the modeling could include running configuration checks against the system (e.g., with ABIScan and other specific tools) to check for any configuration issues/health issues proactively.

Various embodiments will now be discussed in greater detail with reference to the accompanying figures, beginning with FIG. 1.

FIG. 1 illustrates an embodiment of a support cloud platform 100. The platform may be used to through the life cycle of a service. Services may be designed, made available for deployment, deployed to a customer, and monitored using the platform. The customer data center 102 may include one or more target systems 112, 114 that may be the target of the services provided by the platform. The target systems may be servers, computers, rack systems, and the like that run or execute a database and/or other database software used by a customer. A target system may be a hardware or software entity that can have service delivered and may be a host, database, web logic service, and/or the like. In the customer data center 102, the target systems 112, 114 may be managed by an administrator local to the data center 102. The administrator may have physical access to the target systems 112, 114. The cloud platform 100, may provide for the administration and other services of the target systems via a remote interface from a remote location. A gateway 110, located on the data center 102 provides remote access to the data center 102 and one or more target systems 112, 114. The gateway 110 may be a hardware or virtual software appliance installed at the customer data center. The gateway 110 connects to a production cloud 104 of a service provider via a secure connection using a communication module 106 over a network 132. The gateway 110 may optionally have an interface module 108 allowing control of the interactions of gateway 110 to the production cloud 104 of the service provider.

Services may be generated and developed using a common service development framework of the platform. The common service development framework may include a service design 130, delivery engineering 128, and engineering infrastructure 126 modules. The common service development framework may leverage common components that can be used throughout the delivery process (manual and/or automated), and may enable the efficient design, development, testing and release of a service. The common service development framework of the platform enables at least partial automation of the development of a service.

The platform enables delivery engineers to automate the service they are developing. In some embodiments, the development of services may be automated or simplified with the use of reusable components. For example, many of the same deployment, execution, and error handling function used in the services may be designed as reusable components. The components may be reused in many services allowing the design and coding of the service to be focused on the new core functionality of the service. Using the platform, services may be designed and implemented in one or more central locations. A centralized service design and development platform enables a hierarchical and structured service design with reusable components and modules. The development of a service may be, at least in part, automated since a large portion of the components of a service may be assembled from existing reusable components.

After the services are designed, developed, and tested, they may be stored at the production cloud 104. The production cloud 104 may include a library of services 122 and a content library 124. The services and content may be deployed from the production cloud 104 to one or more target systems 112, 114 at a customer data center 102. The deployment, monitoring, and the like of services may be arranged with interaction from the portal 118 and commerce module 120 at the production cloud 104 and the gateway 110 and an interface module 108 at the customer data center 102 via the communication modules 106, 116. The design, deployment and monitoring of the service may be performed remotely from production cloud without the need of an administrator or engineer at the customer's data center 102. The portal 118 of the platform may provide for remote control and administration of services, control of deployment, and analysis of results.

The platform of FIG. 1 may be used to develop, deploy, and manage services for the customer data center 102 and target systems 112, 114. A gateway 110 has access to the target systems 112, 114. Services, in the forms of software, scripts, functions, and the like, may be downloaded from the production cloud 104. The commerce module 120 and the portal for the production cloud 104 provide an interface, selection tools, monitoring tools, for selecting the services, and monitoring the services to be deployed in the customer data center 102. An administrator at the customer data center 102 may view, select, and monitor the services using the portal 118 and commerce module 120. The customer may access the portal 118 and commerce module 120 using interface module 108 at the customer data center 102. The interface module may have a direct or an indirect access to the portal 118 and the commerce module via the communication module 106. For example, using the platform 100, a service may be selected using the commerce module 120.

The commerce module 120 may be accessed using the interface module 108. Once a service is selected and configured for the target systems 112, 114, the service may be deployed from the production cloud 104 to the customer data center 102 via the gateway 110. The gateway may deploy the service on to the target systems. The gateway 110 may be used to gather data statistics, monitor services, and receive system information about the customer data center and the target systems. The data may be processed, analyzed, and transmitted to the production cloud. The data may be used to suggest or deploy services to the customer, present statistics or metrics of the customer's target servers using the portal 118.

Figure 2:
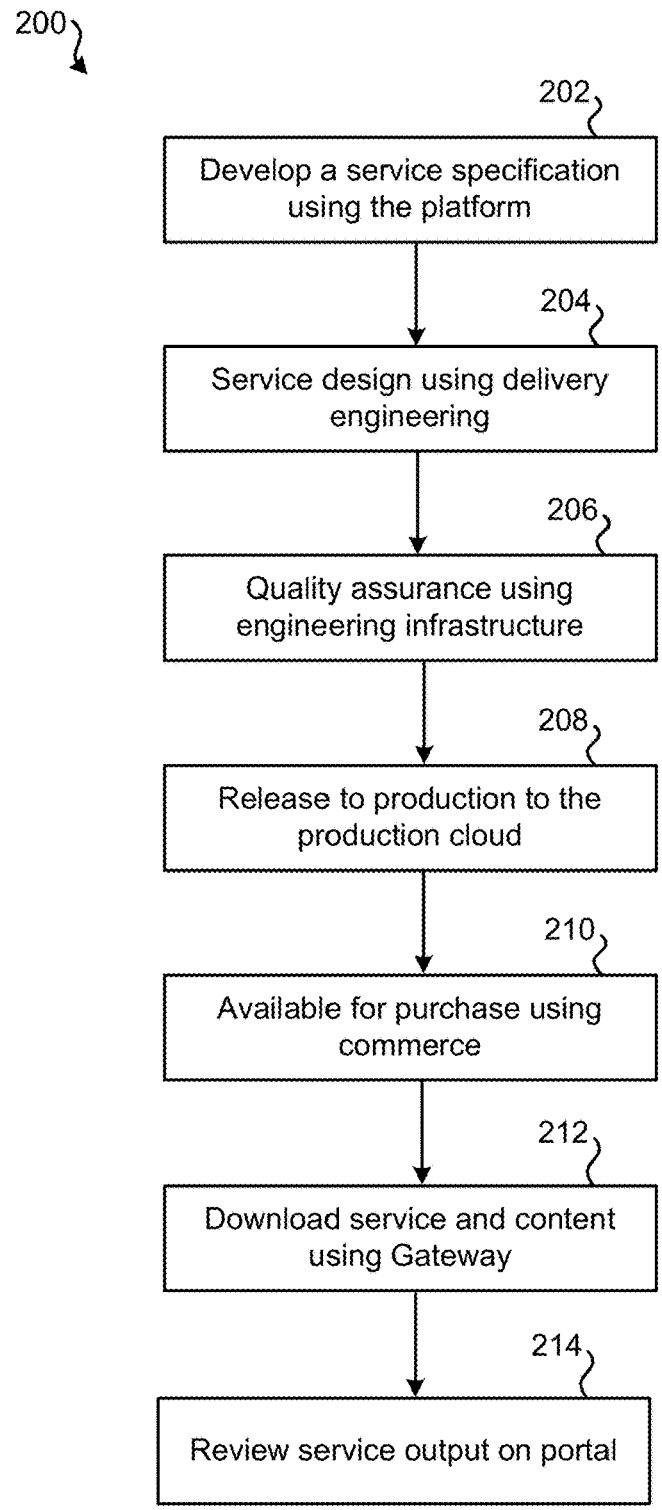
FIG. 2 illustrates a flow diagram summarizing the life cycle of a service.

FIG. 2 shows a flow diagram showing a lifecycle of a service in the context of the platform from FIG. 1. A service begins its life cycle when a service specification is developed using the platform at block 202. The service specification may define the characteristics of the service, requirements, actions the service may take, data the service may monitor or collect, the operating characteristics of the systems of the service and/or the like. The service specification may be developed, at least in part, based on the data received from the platform. Data about customer's target systems, usage, statistics, and the like may be received from the customer's data center via the gateway 110. The data may be used determine the specification of the service. For example, data received from the gateway regarding customer's target systems may indicate that a database on the system may be running on outdated software. A service for upgrading and migrating the database to the new software may be needed. Based on the data received from the gateway the specification for the service may be defined. The data received from the gateway may, for example, include the software versions, database types, sizes, information about the target systems, and the like.

The service specification may be developed in the service design 130 module of the platform. The service design 130 module may include automated tools for analyzing data to determine the service specification. The service design may include input from a development team, management, customer, and/or the like.

Once the specification of the service is defined, the service may be designed in block 204 at the delivery engineering module 128 of the platform 100. The specification may be used by the delivery engineering module 128 to design, develop, and test the service from the specification. The delivery engineering module 128 may assemble one or more existing blocks of code, scripts, functions, and/or the like to implements the service described by the service specification. The delivery engineering 128 module may, at least in part, automatically change parameters for existing services to match the specification for a new service. For example, a database migration service may have many of the same common features independently of the characteristics of the migration. A service for a specific migration may use an existing migration service and disable some unnecessary features, such as data compression, for example. Delivery engineering 128 may in some embodiments comprise of one or more developers who write scripts, code, and the like to generate a program to implement the service. In some embodiments delivery engineering may be an automated system that implements the service from the specification.

The developed service may be passed on to the engineering infrastructure module 126 for quality assurance in block 206. During quality assurance, the service may be tested and content for each service may be developed. The engineering infrastructure may employ a test farm of servers and sample target system that may mirror the parameters, specifications, and characteristics of customer target systems. The test farm may be used to analyze and stress test the service in a rigorous and monitored manner. The service may further be analyzed and redeveloped into reusable components to allow other services to reuse the core functionality and functions developed for the service.

In block 208 the tested service may be passed on to production to the production cloud 104. In block 208 the service is formally released and is ready for a customer download to the customer gateway 110. At the same time, the service may be release to other channels such as marketing, sales, pricing and contracting sites, commerce channels, and the like. The service may be stored or made available at the services module 122.

The service may be made available for purchase at the commerce module 120 of the platform 100 in block 210. The commerce module may include a generated user interface (UI) that a customer may access via a network and a browser and/or the interface module 108 at the customer data center 102. A customer may use the commerce module 120 to search and browse for service offerings. The commerce module 120 may show the features, compatibility, price, and the like for the service and the specific customer. A customer may purchase, review and agree to contract terms for the service, request assistance, and/or the like using the commerce module 120. A service may be made purchased and immediately or after a period of validation made available for delivery and setup at the customer target systems. Validation may include authorization of the customer's target system, payment validation, and/or the like.

After purchase the service and/or content may be downloaded at block 212. After purchase a customer may be provided with access to the portal 118 to initiate service and/or content delivery. The portal may deploy a service and/or content package to the customer's gateway 110. The gateway may then install and/or execute the service and/or content on the target systems automatically. The execution and deployment may be controlled through the portal 118 which may be remote from the customer's data center 102. During and after the deployment and execution of the service and/or content, the gateway may transmit data to the portal regarding the execution of the service, data gathered by the service, status, and/or other data and metrics.

During and after the deployment a customer may access the portal 118 and review the service output in block 214. The portal 118 may provide a summary of the data gathered by the service and transmitted to the portal via the gateway 110. The portal may provide the customer with a full view of all service engagements with the service provider, and also may provide the customer with a deeper understanding of their systems and applications. The portal may comprise and interface and a back-end to facilitate functions of the portal 118 and interact with other parts of the platform 100.

Figure 3:
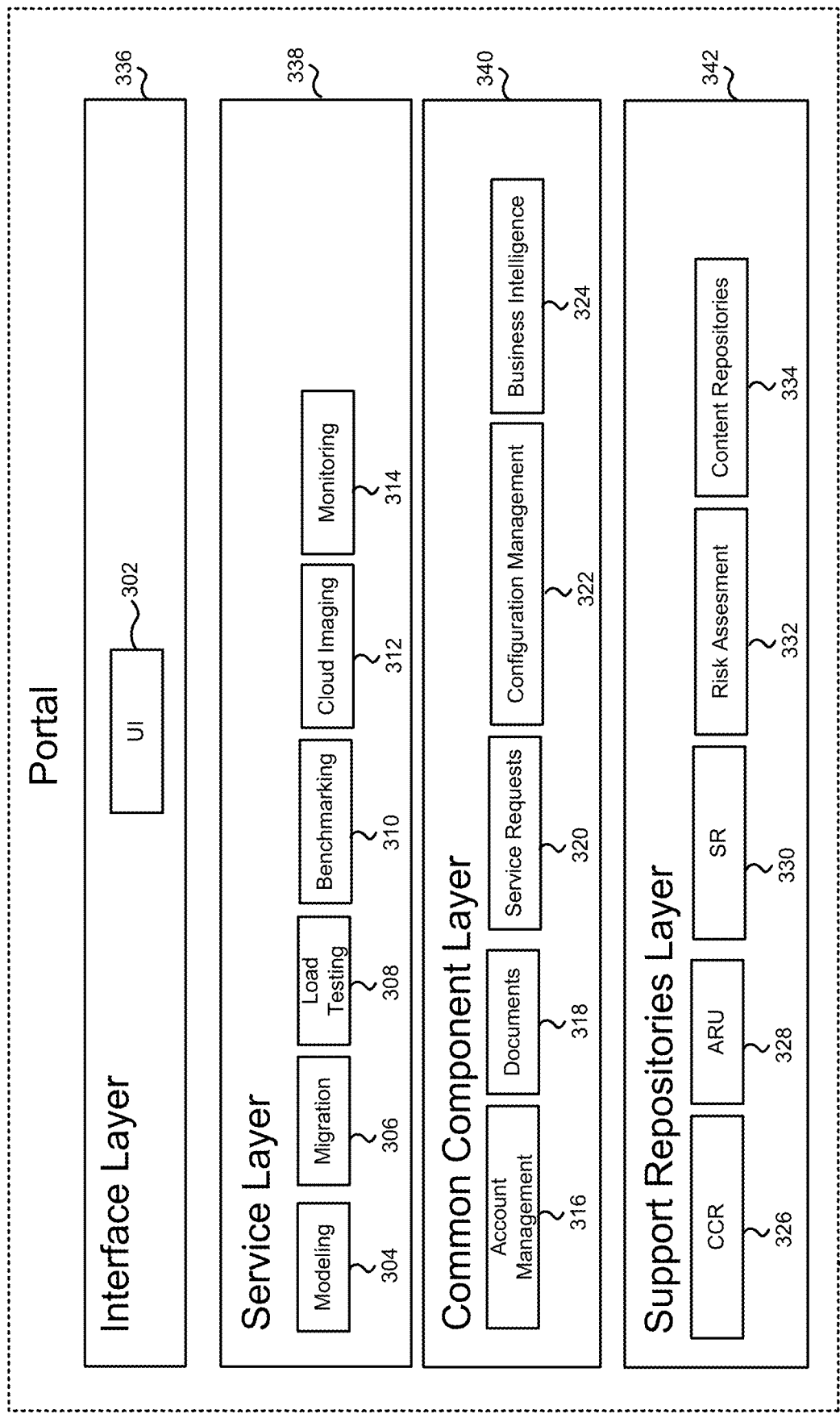
FIG. 3 illustrates a block diagram of the components of an embodiment of a portal.

FIG. 3 shows a block diagram of the structure of the portal 118. The portal 118 may be based on a layered architecture. The portal may be divided into four layers: the interface layer 336, service layer 338, common component layer 340, and a support repositories layer 342. These layers are responsible for the handling of service and customer information and the presentation and orchestration of services. The layers may be used to interface and communicate with the gateway 110, enable remote administrators to interact with data and gateway to deliver service, and/or enable customers to receive service via portal and collaborate with service provider.

The backend of the portal may include a support repositories layer 342. The layer 342 may be used to leverage various sources of data to enrich and or deliver services. The layer may include repositories or access to repositories that may include configuration, patch, SR information and data, and the like. The backend of the portal may further include a common component layer 340. Elements of the layer 340 may include components that are used in support of services during and after deployment. Elements may include an account management module 316 that provides authentication and authorization and security to the portal and the service. Customers may be provided access to the portal, and also granted access/entitlement to one or more services. The layer 340 may further include a documents module 318 which provides the methods for managing documents using the portal. Furthermore the layer 340 includes a service request module for managing the various requests and steps used in the delivery of a service. A configuration management module 322 may be used to manage the configurations associated with a customer and service engagements. A business intelligence module 324 may be used to identify high value information.

The service layer 338 of the portal 118 may include specific modules and functions required for each service. Each type of service may include defined workflow and logic, security, and/or the like. Each type of service may include a module for managing the special workflow, logic and other requirements for the service. Modules for modeling 304, migration 306, load testing 308, benchmarking 310, cloud imaging 312, monitoring 314 may be implemented in the layer 338. In some embodiments, the one or more migration modules 306 may include one or more components, such as a migration engine, configured to provide migration services discussed herein.

Finally, the interface layer 336 of the portal 118 provides an interface such as a graphical user interface 302 that may be used by the customer, service provider, and or administrator. The interface layer represents the presentation layer for the services. The user interface 302 of the interface layer 336 may be a responsive web design and, as such, may work on multiple devices (e.g.: desktop, phone, phablet, tablet). The UI of the portal may provide a common service interface for the services and/or content. The UI may represent and present available, installed, active, and/or like support cloud services in a consistent interface with a similar look and feel. Common user interface components may be used. Navigation methodology may be based on rich service summary reporting with drill-down for more detail. Services may be tightly coupled with customer configurations. Technical data required for service delivery (analysis, verification, reporting) may be collected automatically. Analytics may be used extensively to help reduce the information overload by creating 'easy to consume' dashboards and reports.

Figure 4:
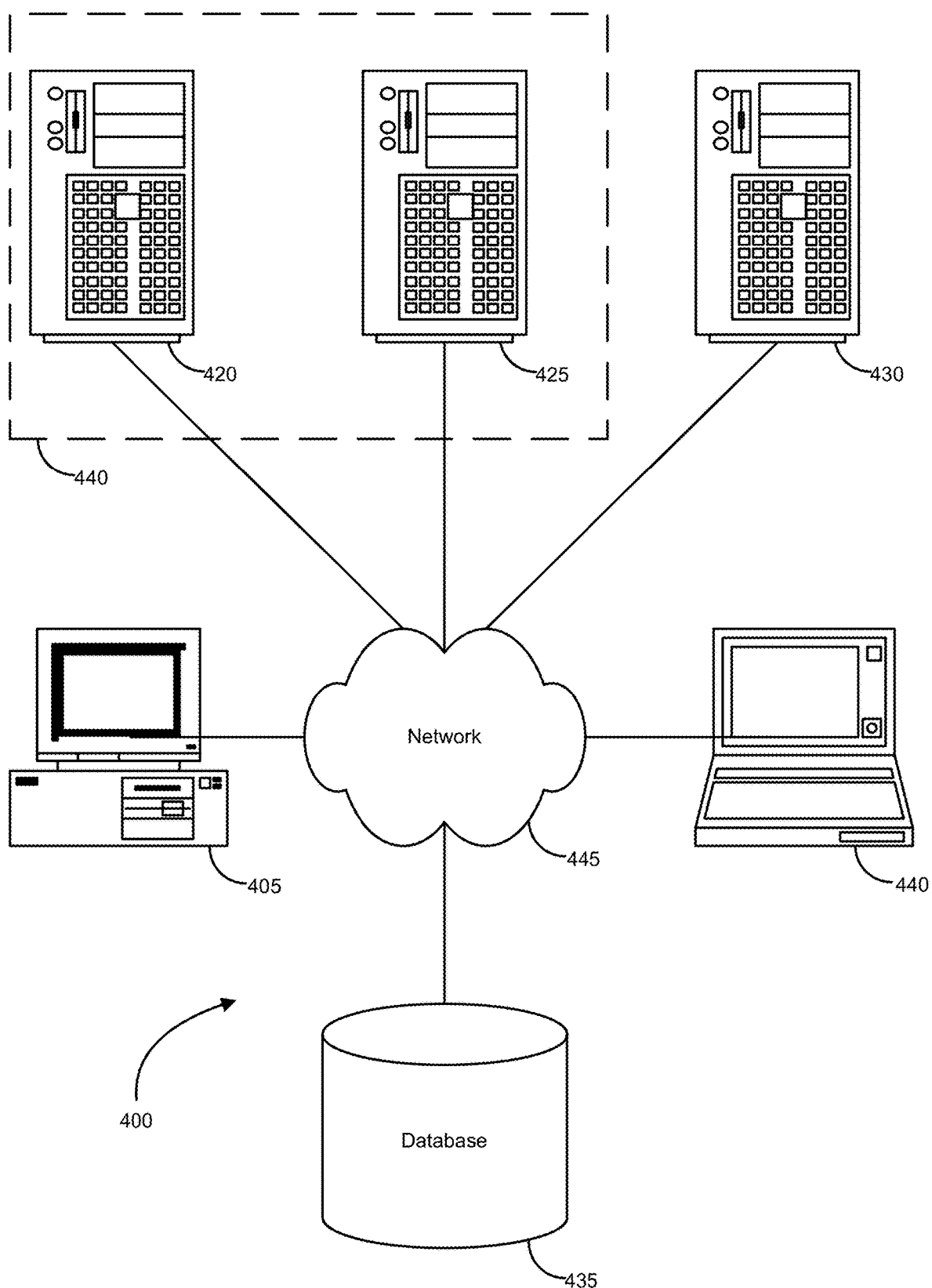
FIG. 4 illustrates a block diagram of components of an exemplary operating environment in which various embodiments of the present invention may be implemented.

Each of the embodiments disclosed herein may be implemented in a general-purpose computer system. FIG. 4 is a block diagram illustrating components of an exemplary operating environment in which various embodiments of the present invention may be implemented. The system 400 can include one or more user computers 405, 410, which may be used to operate a client, whether a dedicated application, web browser, etc. The user computers 405, 410 can be general purpose personal computers (including, merely by way of example, personal computers and/or laptop computers running various versions of Microsoft Corp.'s Windows and/or Apple Corp.'s Macintosh operating systems) and/or workstation computers running any of a variety of commercially-available UNIX or UNIX-like operating systems (including without limitation, the variety of GNU/Linux operating systems). These user computers 405, 410 may also have any of a variety of applications, including one or more development systems, database client and/or server applications, and web browser applications. Alternatively, the user computers 405, 410 may be any other electronic device, such as a thin-client computer, Internet-enabled mobile telephone, and/or personal digital assistant, capable of communicating via a network (e.g., the network 415 described below) and/or displaying and navigating web pages or other types of electronic documents. Although the exemplary system 400 is shown with two user computers, any number of user computers may be supported.

In some embodiments, the system 400 may also include a network 415. The network may can be any type of network familiar to those skilled in the art that can support data communications using any of a variety of commercially-available protocols, including without limitation TCP/IP, SNA, IPX, AppleTalk, and the like. Merely by way of example, the network 415 may be a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth protocol known in the art, and/or any other wireless protocol); and/or any combination of these and/or other networks such as GSM, GPRS, EDGE, UMTS, 3G, 5.5 G, CDMA, CDMA2000, WCDMA, EVDO etc.

The system may also include one or more server computers 420, 425, 430 which can be general purpose computers and/or specialized server computers (including, merely by way of example, PC servers, UNIX servers, mid-range servers, mainframe computers rack-mounted servers, etc.). One or more of the servers (e.g., 430) may be dedicated to running applications, such as a business application, a web server, application server, etc. Such servers may be used to process requests from user computers 405, 410. The applications can also include any number of applications for controlling access to resources of the servers 420, 425, 430.

The web server can be running an operating system including any of those discussed above, as well as any commercially-available server operating systems. The web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 405, 410. As one example, a server may execute one or more web applications. The web application may be implemented as one or more scripts or programs written in any programming language, such as Java™, C, C# or C++, and/or any scripting language, such as Perl, Python, or TCL, as well as combinations of any programming/scripting languages. The server(s) may also include database servers, including without limitation those commercially available from Oracle®, Microsoft®, Sybase®, IBM® and the like, which can process requests from database clients running on a user computer 405, 410.

In some embodiments, an application server may create web pages dynamically for displaying on an end-user (client) system. The web pages created by the web application server may be forwarded to a user computer 405 via a web server. Similarly, the web server can receive web page requests and/or input data from a user computer and can forward the web page requests and/or input data to an application and/or a database server. Those skilled in the art will recognize that the functions described with respect to various types of servers may be performed by a single server and/or a plurality of specialized servers, depending on implementation-specific needs and parameters.

The system 400 may also include one or more databases 435. The database(s) 435 may reside in a variety of locations. By way of example, a database 435 may reside on a storage medium local to (and/or resident in) one or more of the computers 405, 410, 415, 425, 430. Alternatively, it may be remote from any or all of the computers 405, 410, 415, 425, 430, and/or in communication (e.g., via the network 420) with one or more of these. In a particular set of embodiments, the database 435 may reside in a storage-area network ("SAN") familiar to those skilled in the art. Similarly, any necessary files for performing the functions attributed to the computers 405, 410, 415, 425, 430 may be stored locally on the respective computer and/or remotely, as appropriate. In one set of embodiments, the database 435 may be a relational database, such as Oracle 20g, that is adapted to store, update, and retrieve data in response to SQL-formatted commands.

Figure 5:
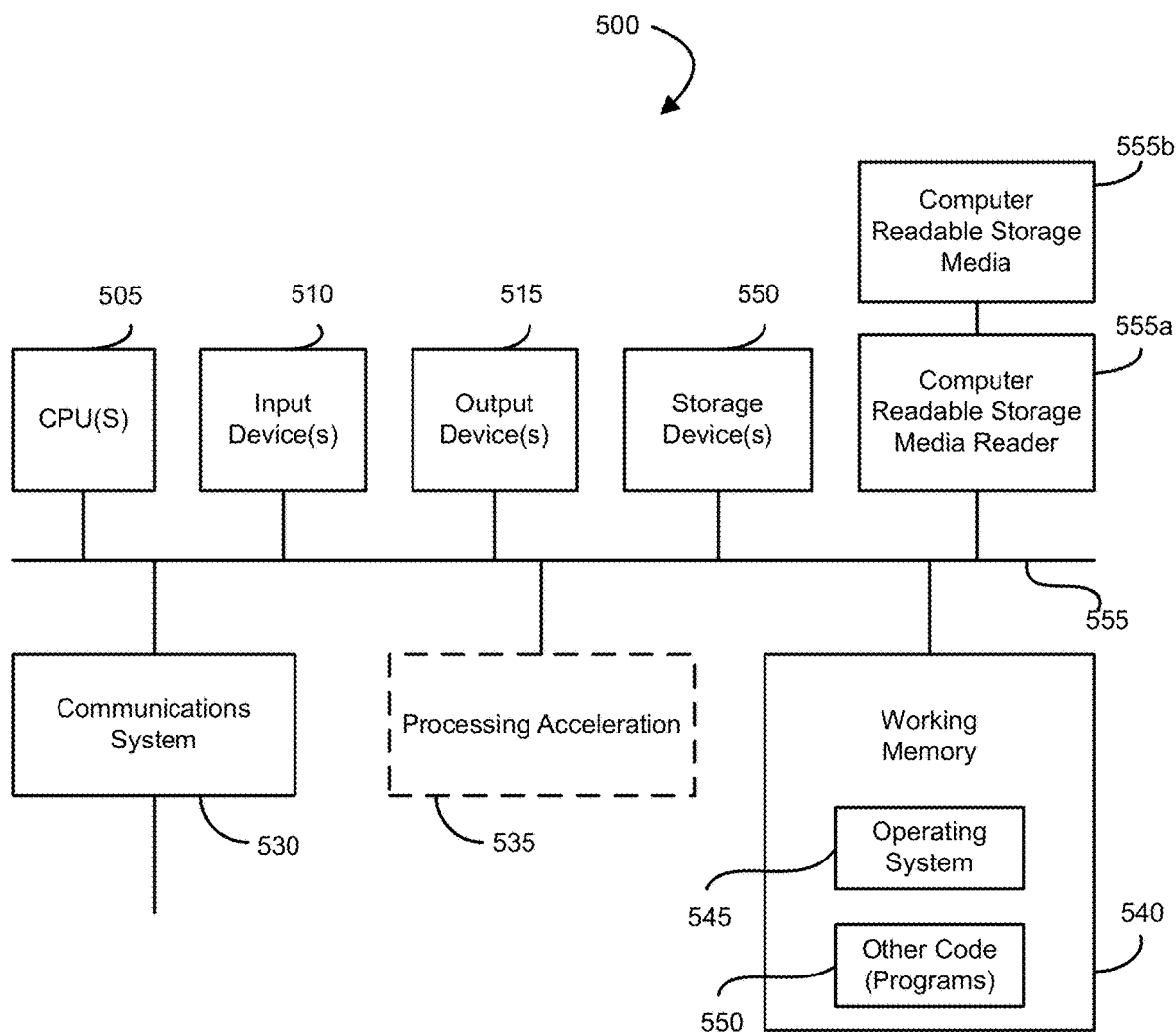
FIG. 5 illustrates a block diagram of an exemplary computer system in which embodiments of the present invention may be implemented.

FIG. 5 illustrates an exemplary computer system 500, in which various embodiments of the present invention may be implemented. The system 500 may be used to implement any of the computer systems described above. The computer system 500 is shown comprising hardware elements that may be electrically coupled via a bus 555. The hardware elements may include one or more central processing units (CPUs) 505, one or more input devices 510 (e.g., a mouse, a keyboard, etc.), and one or more output devices 515 (e.g., a display device, a printer, etc.). The computer system 500 may also include one or more storage device 520. By way of example, storage device(s) 520 may be disk drives, optical storage devices, solid-state storage device such as a random access memory ("RAM") and/or a read-only memory ("ROM"), which can be programmable, flash-updateable and/or the like.

The computer system 500 may additionally include a computer-readable storage media reader 525a, a communications system 530 (e.g., a modem, a network card (wireless or wired), an infra-red communication device, etc.), and working memory 540, which may include RAM and ROM devices as described above. In some embodiments, the computer system 500 may also include a processing acceleration unit 535, which can include a DSP, a special-purpose processor and/or the like.

The computer-readable storage media reader 525a can further be connected to a computer-readable storage medium 525b, together (and, optionally, in combination with storage device(s) 520) comprehensively representing remote, local, fixed, and/or removable storage devices plus storage media for temporarily and/or more permanently containing computer-readable information. The communications system 530 may permit data to be exchanged with the network 520 and/or any other computer described above with respect to the system 500.

The computer system 500 may also comprise software elements, shown as being currently located within a working memory 540, including an operating system 545 and/or other code 550, such as an application program (which may be a client application, web browser, mid-tier application, RDBMS, etc.). It should be appreciated that alternate embodiments of a computer system 500 may have numerous variations from that described above. For example, customized hardware might also be used and/or particular elements might be implemented in hardware, software (including portable software, such as applets), or both. Further, connection to other computing devices such as network input/output devices may be employed. Software of computer system 500 may include code 550 for implementing embodiments of the present invention as described herein.

Each of the methods described herein may be implemented by a computer system, such as computer system 500 in FIG. 5. Each step of these methods may be executed automatically by the computer system, and/or may be provided with inputs/outputs involving a user. For example, a user may provide inputs for each step in a method, and each of these inputs may be in response to a specific output requesting such an input, wherein the output is generated by the computer system. Each input may be received in response to a corresponding requesting output. Furthermore, inputs may be received from a user, from another computer system as a data stream, retrieved from a memory location, retrieved over a network, requested from a web service, and/or the like. Likewise, outputs may be provided to a user, to another computer system as a data stream, saved in a memory location, sent over a network, provided to a web service, and/or the like. In short, each step of the methods described herein may be performed by a computer system, and may involve any number of inputs, outputs, and/or requests to and from the computer system which may or may not involve a user. Those steps not involving a user may be said to be performed by the computed without human intervention. Therefore, it will be understood in light of this disclosure, that each step and each method described herein may be altered to include an input and output to and from a user, or may be done automatically by a computer system. Furthermore, some embodiments of each of the methods described herein may be implemented as a set of instructions stored on a tangible, non-transitory storage medium to form a tangible software product.

Nearly all software-based systems are often required to undergo periodic upgrades in order to take advantage of new computing technologies. During the migration process, a customer may wish to migrate one or more old systems/system components over to a fewer number of new systems/system components. Such system components could include any one or combination of server(s), OS(s), mid-tier component(s), application(s), database(es), and/or the like. For example, customers often ask the question "if I were to move database A and database B over to this new machine, would it work?" Unfortunately, answering this question requires a great deal of analysis and work. Configuration assessments, performance assessments, and other system evaluations may take as long as 30 days. Customers may have hundreds or even thousands of system components such as databases, and thus determining which system components can be migrated to new systems may quickly become a very difficult task.

Embodiments described herein may utilize an existing Enterprise Manager to consistently and/or periodically monitor and model the customer systems. An Enterprise Manager agent may be employed to collect and monitor modeling data associated with the customer's systems. This information may be uploaded to a cloud service through a gateway that resides on a customer's Enterprise Manager system. The cloud service can then perform calculations and analysis on the data recorded by the agent in order to provide a recommendation for specific migration scenarios, e.g., whether or not server A and application B can be moved to a new system. Additionally, engineers may be provided with other analyses relevant to systems migration, such as security considerations, data integrity considerations, data criticality considerations, and/or the like.

Figure 6:
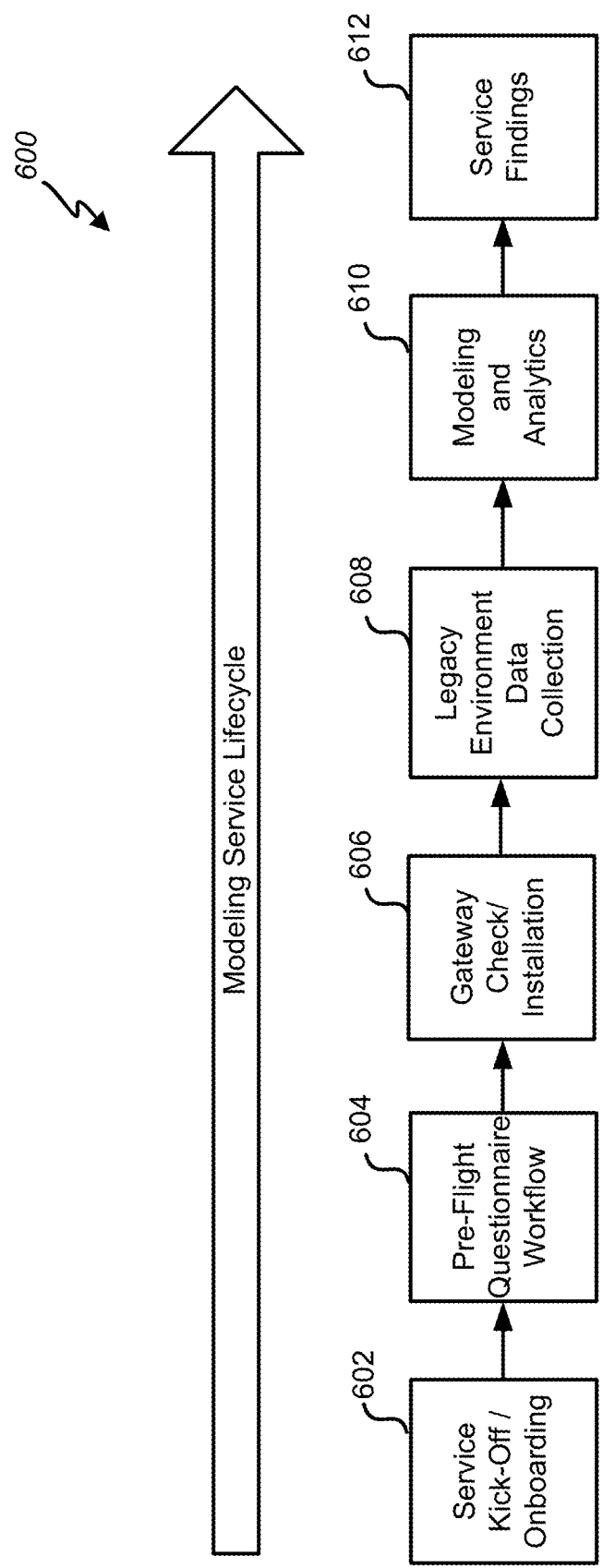
FIG. 6 illustrates a block diagram that illustrates certain aspects of a lifecycle of a consolidation planning service in accordance with certain embodiments.

FIG. 6 is a block diagram that illustrates certain aspects of a lifecycle 600 of a modeling service, in accordance with certain embodiments of the present disclosure. The modeling service may provide an automated and validated approach that may allow a customer to meet their recovery time objective. The modeling service 600 may provide customers with legacy systems, such as, for example, databases, operating systems, applications, and/or the like, with effective migration planning for migration from non-cloud technologies to a cloud (e.g., a private cloud). With an automated and validated approach that may allow a customer to meet their recovery time objective, the modeling service 600 may also allow for improved prediction of the size and workload of a cloud system by analysis of the source environments in view of transition to the cloud. One goal may be to replace existing system components which are approaching end of service life (EOSL) with new system components in a virtualized environment in order to reduce overall power, maintenance and support costs in select data centers. An objective may be to replicate the source operating environment on either standalone or virtual machine platforms.

One phase of the modeling service lifecycle may correspond to a service kick-off and onboarding phase 602. The portal may be initialized for access as required. In some embodiments, one or more automated process flows may facilitate the provisioning of project contacts with accounts, the right roles, and security access. Onboarding may be performed in various ways in various embodiments. For example, onboarding may be initiated by a customer or a service representative with the sending the customer/customer team one or more notifications with links for onboarding. Any one or combination of workflows, chat windows, web conference sessions, videos, video communication sessions, and/or the like may be provided to outline service delivery processes, outline tooling installation, setup and connectivity, outline key scenarios, answer questions, talk through the pre-flight questionnaire workflows, and/or the like.

One phase of the modeling service lifecycle may correspond to a pre-flight questionnaire workflow phase to capture customer-furnished data, as indicated by block 604. The customer-furnished data may include a customer's key priorities for the service and detailed information for the service (performance data, annotation, collection time period, etc.). For example, business objectives may include refreshing technology to improve TCO, refreshing technology to improve performance, reducing floor space and power, improving availability, and/or the like. Process flows may capture information detailing applications to be considered for transition, including information such as function, location, SLAs, maintenance windows, point of contact, list of hosts and targets which it consists of, configuration standards, hardware versions, software versions, workloads (particularly, but not limited to, the most critical), platinum delta patches, platinum delta configuration, configuration settings, recommended changes for optimal placement, business drivers and release cycles, storage and compute requirements, and/or the like. Captured information may indicate desired time period(s) for running the performance and other data capture to give a strong representative sample for trending analysis. Destination systems for the modeling may be identified. A delivery date for modeling deliverables may be defined. In some embodiments, process flows may be directed to various customer application teams.

One phase of the modeling service lifecycle may correspond to a gateway check and/or installation phase, as indicated by block 606. It may be determined if a gateway 110 is available to give access to/from one or more customer sites in order to allow service delivery. If a gateway 110 is available, the gateway configuration may be examined to ensure that the gateway is properly configured, including the agents, with configuring of the gateway 110 and the agents being performed as necessary. If a gateway 110 is not available, the gateway may be downloaded for installation. It may be installed at a customer site and configured along with the agents and plug-ins using auto-discovery to set up workflow for the service. Agents may be deployed on all relevant hosts identified via pre-flight phase. The ASR and EM Harvester may be set up and validated.

One phase of the modeling service lifecycle may correspond to a legacy environment data collection phase, as indicated by block 608. Such data collection includes hardware and software data collection. Another phase of the modeling service lifecycle may correspond to a modeling and analytics phase, as indicated by block 610. Still another phase of the modeling service lifecycle may correspond to a service findings phase, as indicated by block 612. Certain aspects of the phases are explained in greater detail with reference to the following figures. The diagram may represent an overview of certain aspects of such a lifecycle 600 of the migration service with the overall flow involved according to certain embodiments. Though certain aspects may be separated for the sake of description, it should be understood that certain steps may overlap, and may be performed simultaneously or substantially simultaneously.

Figure 7A:
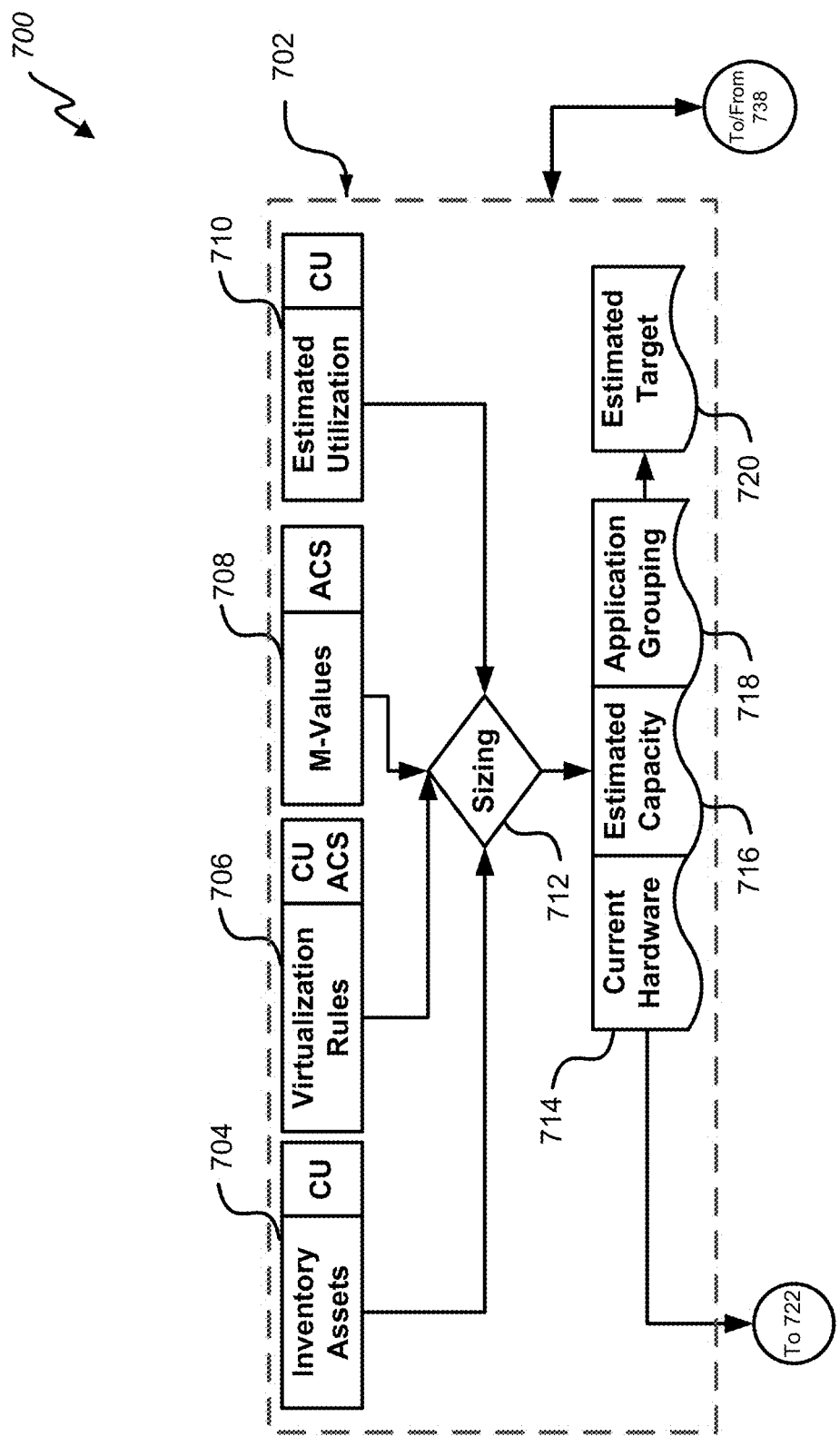
FIGS. 7A and 7B illustrate a high-level block diagram of a cloud consolidation planning service in accordance with certain embodiments.
Figure 7B:
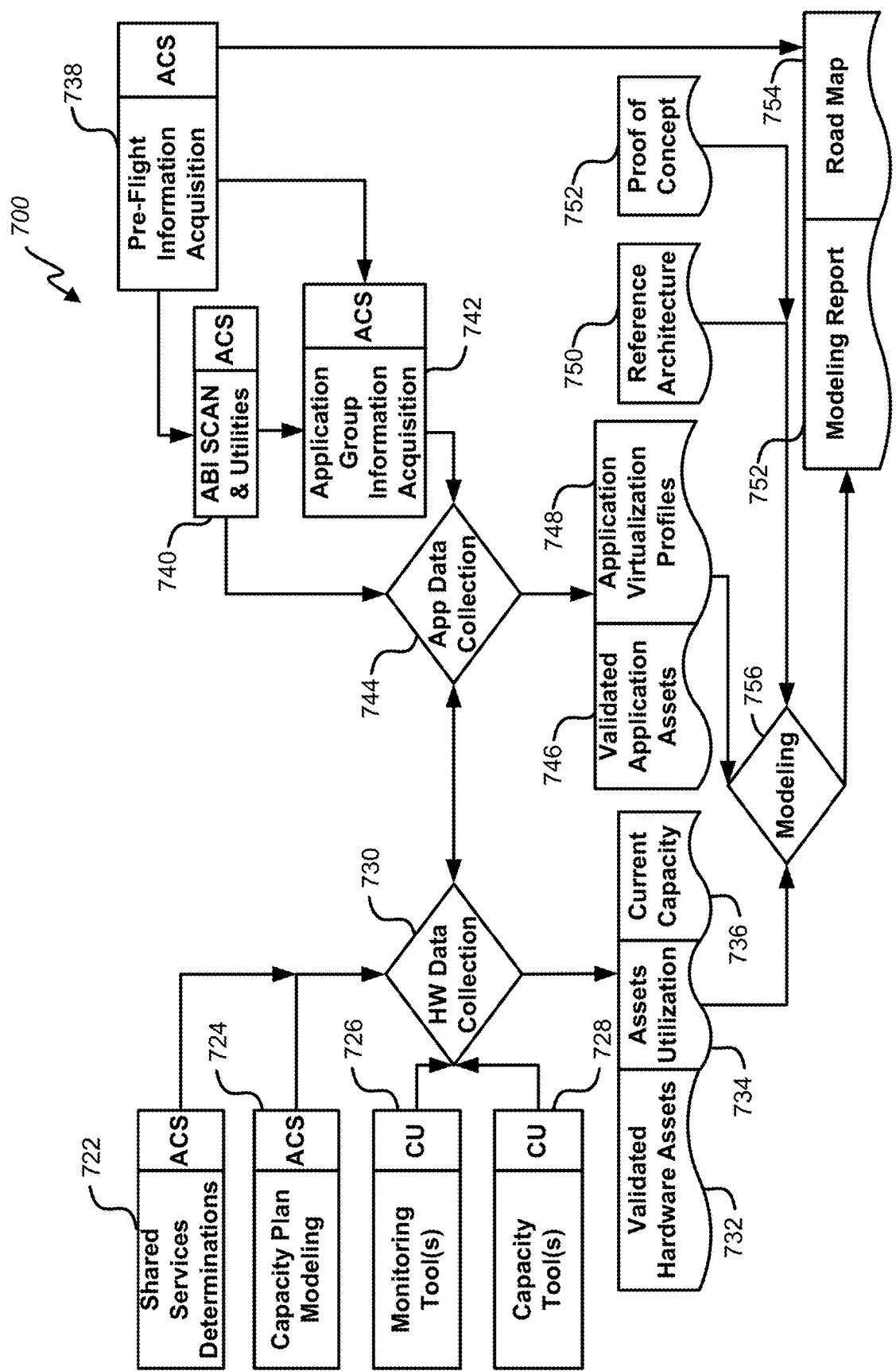

FIGS. 7A and 7B depict a high-level block diagram of certain aspects of information handling for a modeling service 700, including analytics service, for systems and system components, in accordance with certain embodiments of the present disclosure. Teachings of the present disclosure may be implemented in a variety of configurations. As such, the aspects comprising the services, systems, engines, and/or methods described herein may be shuffled, re-ordered, and/or omitted in any suitable manner and may depend on the implementation chosen. Moreover, while the following aspects may be separated for the sake of description, it should be understood that certain steps may be performed simultaneously or substantially simultaneously.

The pre-flight information acquisition 738 may correspond to the pre-flight questionnaire workflow phase, as discussed herein. Accordingly, the pre-flight information acquisition 738 may include one or more automated process flows to capture customer-furnished data. In some embodiments, various points in the process could include any one or combination of suitable interface points via the portal with the customer and/or advanced customer service. By way of example without limitation, such interface points could include one or more those depicted by CU (for customer interface) and/or ACS (for advance customer service).

The cloud modeling service 700 may analyze the source environment based on one or more target estimation components 702. In various embodiments, an estimated target design 720 may be based at least in part on any one or combination of the inventory assets 704, virtualization rules 706, M-values 708, estimated utilization 710, sizing 712, current hardware 714, estimated capacity 716, and/or application grouping 720. The estimated target design 720 may be an initial design that is later developed.

Various assets of the legacy system may be inventoried, as indicated by block 704. Modeling according to various embodiments may concern such assets as any number of legacy systems, subsystems, and/or system components, such as any one or combination of server(s), OS(s), mid-tier component(s), application(s), database(es), and/or the like. System topology and footprint information may be determined.

Virtualization rules 706 may be based at least in part on any one or combination of:
- Application classification, such as designation of "mission critical" classification(s), mid-level classification(s), low-level classification(s), for example.
- Application workload
- Software licensing
- Use of network file system server(s) and user root privileges
- Loadable kernel modules and system kernel calls
- Data security issues on shared frame
- Security requirements
- Use of clustering software
- Known resource bottlenecks
- Application dependencies
- Change of host and IP address
- Use of application NAS
- Vtiers or portable application containers
- Use of load balancers
- Firewall rules In some embodiments, one or more M-values 708 (also known as the Oracle Sun Constant Performance Metric, or SCPM) may offer a representation of the processing potential of a server running workloads. M-values 708 are available across different product lines and releases. By way of example without limitations, M-values 708 may be available for each unique combination of:
- Server range
- CPU type (including clock speed and E-cache size)
- Number of CPUs
- OS release M-values 708 may take into account the performance of a number of industry-standard workloads, including OLTP, DSS, and Java-based workloads. M-values 708 may be revised according to more accurate scaling or speedup information when such becomes available.

The estimated utilization 710 may include any one or combination of CPU utilization, memory utilization, and/or projected capacity growth, say, for the next X months/years. As indicated by block 712, cloud consolidation planning services for systems according to certain embodiments may ensure that systems are properly modeled and sized for a customer's migration, consolidation, upgrade, patching process, and/or the like.

In various embodiments, hardware data collection 730 may be based on any one or combination of shared service determinations 722, capacity plan modeling 724, monitoring tools 726, capacity tools 728, and/or the like. One or more shared services determinations 722 may indicate architecture information corresponding to architectures shared between older systems and newer systems (e.g., between older SPARC based systems and the latest SPARC architectures). The capacity plan modeling 724 may include details related to CPU utilization, memory utilization, space left in the rack, remaining capacity of target systems (which may indicate if more inventory is needed), and capacity in each geography or data facility. The modeling tools 726 may include the use of Consolidation Planner (a feature within Enterprise Manager) and advanced reporting capabilities within the portal via the gateway. The capacity tools may also be repeated through the Consolidation Planner (feature within Enterprise Manager), but additional intelligence may be accessed via the gateway by way of M-values to determine max capacity of both source and target systems. From the hardware data collection 730, information on validated hardware assets 732, assets utilization 734, and/or current capacity 736 may be determined. Validated hardware assets 732 may be inventory assets 704 determined to be in scope for consolidation.

In various embodiments, application data collection 744 may be based on applying tools such as Explorer and ABI scan 704 and/or application group information acquisition 742 process flows. From the application data collection 744, information on validated application assets 746 and/or application virtualization profiles 748 may be determined. Application virtualization profiles 748 may indicate details of applications, specifying what can be virtualized, what business groups can have access to particular virtualized applications, etc. Application virtualization profiles 748 may provide a high-level description of the source environment and the proposed target environment.

With data collection 730, 744, the system components may be configured for monitoring for any suitable time period that allows for a representative sample of any one or combination of configuration data, performance data, workload data, storage data, space data, and/or the like. In some embodiments, data collection may be performed with Enterprise Manager and may be effected through agents, which may have plugins used to monitor and manage a specific target type. The data collection 730, 744 may allow for up/down availability.

Reference architecture 750 may be a representation of the proposed target environment and may include items such as maintenance on systems, whether and which systems/system components need to be highly available, where system systems/system components will reside, how systems/system components will be racked and stacked, whether, which, and to what extent systems/system components can be virtualized, and/or the like. Proof of concept 752 may be limited to a certain number of systems, say, a minimum of 50 systems. For a fixed scope service, there may be a required amount of time needed to establish a working consolidation planning service process.

The modeling 756 may analyze and model key system areas such as system footprint, topology, performance and space trends, and configuration to a 'future state' environment, enabling more accurate transition planning. The modeling 756 may include scenario-based modeling. Scenarios may include but are not limited to any one or combination of tech refresh, database consolidation, data center optimization, and/or workload rationalization. Consolidation scenarios, for example, may be based on selected utilization targets, such as 80% utilization, 90% utilization, or any suitable utilization value. By way of example without limitation, various embodiments may measure, analyze, determine, address, resolve, validate, and/or optimize any one or combination of:
- Application performance and scalability;
- Application Server component optimization and configuration;
- Correct distribution of processes and users across application servers to allow the application(s) to achieve optimum usage of hardware resources, and to allow software deployments to perform as required as more users and processes are added;

Underlying RDBMS optimization and configuration;

Server utilization;

Workflow setup;

Performance or scalability issues;

Sizing of hardware for running server resources and confirmation that these process configurations and set-up meet established business requirements;

Sizing of client and server resources;

Areas for tuning that will improve performance of specific server processes; and/or the like.

The modeling 756 may perform workload mapping to achieve an efficient and cost-effective use of a targeted migration environment without reducing existing capabilities which are key to the customer's business. In some embodiments, cloud consolidation planning service may be executed prior to a system or systems undergoing a significant change, such upgrade, migration, consolidation, patching, configuration/capacity change, and/or the like. The modeling 756 could be performed against test, development, and production environments in a non-disruptive fashion. The modeling 756 may be designed to be pre-emptive, in that modeling services may be performed prior to any change. One benefit of the pre-emptive approach may be that issues/sizing are identified and resolved/implemented "upstream" in the modeling phase are less expensive than to resolve/implement "downstream" in the migration phase of a system's transformational lifecycle.

Some embodiments of cloud consolidation planning service may include features for capturing a production workload measurement and recording it as a point-in-time baseline. A captured production workload may be mapped to a destination environment on a newer, more efficient server hardware platform. Whilst performing the workload comparison on development, test or production systems, certain embodiments may also capture future growth, storage, and annotation data for a more granular and accurate analysis. Certain embodiments may provide the ability to model and size identified systems into a grouping of similar system characteristics based on behaviors, configurations and footprints. For instance, certain embodiments may capture, model, and identify to the customer which groupings of databases, can coexist based on behaviors, configurations and footprints.

In some embodiments, the modeling 756 may include running scripts to identify a platinum delta (i.e., a deviation from an optimal configuration) and present a report regarding the results. As yet another example, the modeling could include running configuration checks against the system (e.g., with ABIScan and/or other tools) to check for any configuration issues/health issues proactively.

In some embodiments, the modeling 756 may determine the "best fit" virtual target configuration. Such a configuration may be based at least in part on one or more of the following. Applications targets may designated to run in particular zones and/or virtual machines according to customer standards. Each source server workload may be mapped to an equivalent unit on an appropriate target server. Production from development/QA/test environments may be separately designated to separate physical servers. Existing physical RAM may be mapped to virtual container/VM RAM. Sizing of target zones may be based on measured utilization plus projected growth of existing server computational resources (M-value). Target physical servers may be designated with a reserve minimum of total CPU resources (e.g., 30% or any suitable value), which may include a portion for the global zone and a portion for excessive CPU cycles incurred by the containers to provide sufficient headroom. Container memory sizes can be increased in discrete increments of X GB as needed (with a predetermined minimum of allocated per container, such as 2 GB or any suitable value). High availability applications may not be grouped on the same physical server. High availability frames may be identified ahead of time to avoid delays in cluster hardware/software installation. Application maintenance windows may be the same for the target physical server (frame). One goal may be to achieve a consolidation ratio from source to target (e.g., 5:1 or any suitable ratio). One goal may be to not exceed X number of containers per physical server. Containers may be planned to go live with shares based resource controls in place to prevent performance issues and to properly isolate the container. NAS mounts may not be available once a container is configured on the target server. Host-based mirroring may be included when a disk group size meets a predetermined threshold (e.g., 110 GB or any suitable value).

Findings and prioritized recommendations may result from cloud modeling, such as one or more modeling reports 750 and a road map 752. The road map 752 may indicate what hardware platforms the customer ultimately wants to use and what methodology will be used to migrate the systems. The road map 752 may correspond to a blueprint developed to provide a detailed design of the proposed target environment. The blueprint may include a selection of the method by which application data is to be moved from the source storage to the target storage. The blueprint may be refined based on the migration service described in one or more cross-referenced applications.

A mapping feature may provide for virtual versus physical mapping based on the types of systems, databases, business units, operational constraints, etc. A detailed description and comparison of workloads grouped by application may be generated. One application may have multiple servers listed below it. Servers may be listed as standalone, clustered or load balanced. Mapping these servers as virtual instances across a single frame or multiple frames could be a key recommendation. Further analysis may include business unit, order of priority, and revenue impact of a system.

As another example, the modeling may provide an identification of system configurations, including which systems cannot be relocated until they are updated via patches or by upgrading and which systems cannot be relocated at all due to business constraints. Which operating environments are compatible may be identified, as well as any rules governing the compatibility matrices associated with the source environments. Consolidation options for systems may be identified. Also, for example, with systems and other key performance data in the environment being reviewed, the modeling may identify resource bottlenecks and/or areas for optimization (e.g., based on production load captured).

Figure 8:
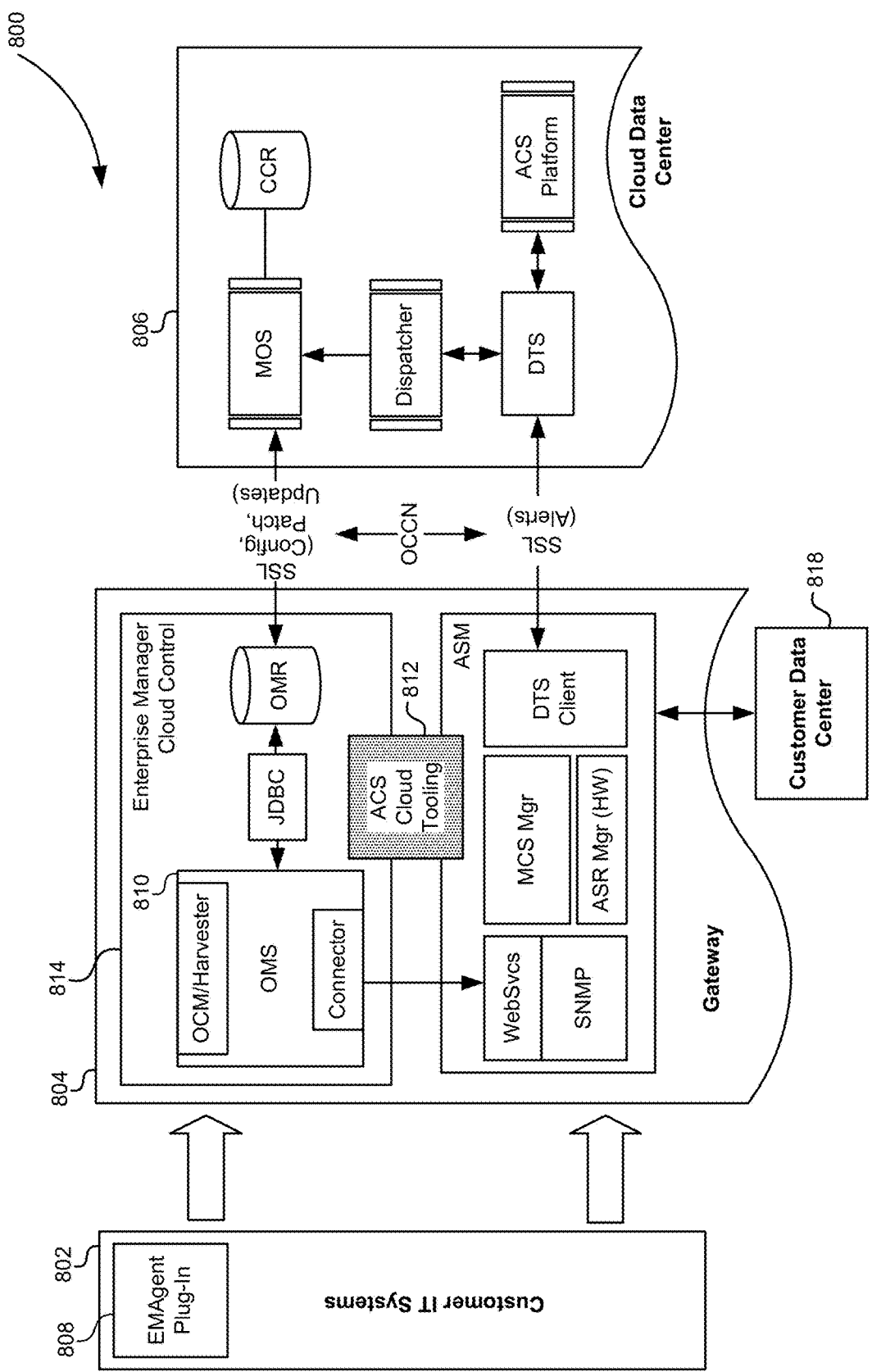
FIG. 8 illustrates a diagram of an architecture for implementing a systems consolidation planning service, according to certain embodiments.

FIG. 8 illustrates a diagram of an architecture for implementing a system modeling and analytics service, in accordance with certain embodiments. The modeling and analytics service may be designed to help customers and their business teams to perform, for example, a workload mapping exercise to achieve the most efficient and cost-effective use of their targeted migration environment without reducing their existing capabilities. The modeling and analytics service may be performed using a customer's existing system/database estate as an input. For example, a customer IT system 802 may be used. The customer IT system 802 may include multiple environments such as development, test and production environments, system components, databases, and/or the like. In many cases, systems and system components in the customer IT system 802 may be implemented with legacy hardware that is no longer considered state-of-the-art or in a system that is no longer supported as a platform or as a current-supported software version.

In some embodiments, the modeling and analytics service may be designed to be proactive, in that it is performed during an assessment phase of a system consolidation process. The results of the modeling and analytics service may be used to plan the actual system consolidation and migration steps. For example, the modeling and analytics service may analyze development, test, and/or production systems prior to planning the actual system consolidation. One key benefit of this preemptive service is the ability to model and size system scenarios that group similar systems/system components based on behaviors, configurations, and/or outputs. The grouping of similar systems/system components may be done in accordance with a set of best practices as identified by the customer. By performing this analysis in advance of the actual system consolidation process, this assessment phase may greatly reduce the risk of rising costs to resolve migration problems.

In order to collect performance data, an agent 808 may be deployed on the customer IT system 802. For example, an Enterprise Manager Agent may be installed as a collector that gathers information in response to detected events, such as a database going on/off line. These agents may be configured to provide performance data to an Enterprise Manager 814. The collected data may be selected so as to provide relevant system component metrics for the modeling process described below. For example, the agent 808 may be focused on capturing a production workload for a selection of system components such that they can be mapped to a destination environment on a newer, more efficient platform.

The agent 808 may send performance data collected from the customer IT system 802 to a gateway 804. In some embodiments, the collected data may be sent to the Enterprise Manager Cloud Control 814 that resides within the gateway. The gateway 804 may be configured to operate on a customer system as a control point for managing how internal users and/or application assets are exposed to outside systems. The gateway 804 may provide access security, data security, auditing and monitoring capabilities, and integration with external systems. In one embodiment, the gateway 804 may provide access to a provider data center 818 and a cloud data center 806 that is remotely located away from the customer IT system 802. The cloud data center 806 may be operated by a provider of databases, software, and other system components used by the customer IT system 802.

The gateway 804 may include a type of Enterprise Manager 814 that is configured to operate in conjunction with the cloud data center 806. A cloud tooling module 812 may operate with the enterprise manager 814 to extract and/or modify data that is already being collected by the enterprise manager 814 during normal operations. The data collected and/or modified by the cloud tooling module 812 may be selected as being relevant to modeling system operations. These data may then be provided to the cloud data center 806 for processing. In some embodiments, the gateway 804 may operate in a manner that is transparent to the customer. Data for use in system/system component modeling may be collected in the background during normal operations and stored at the provider data center 818.

Figure 9:
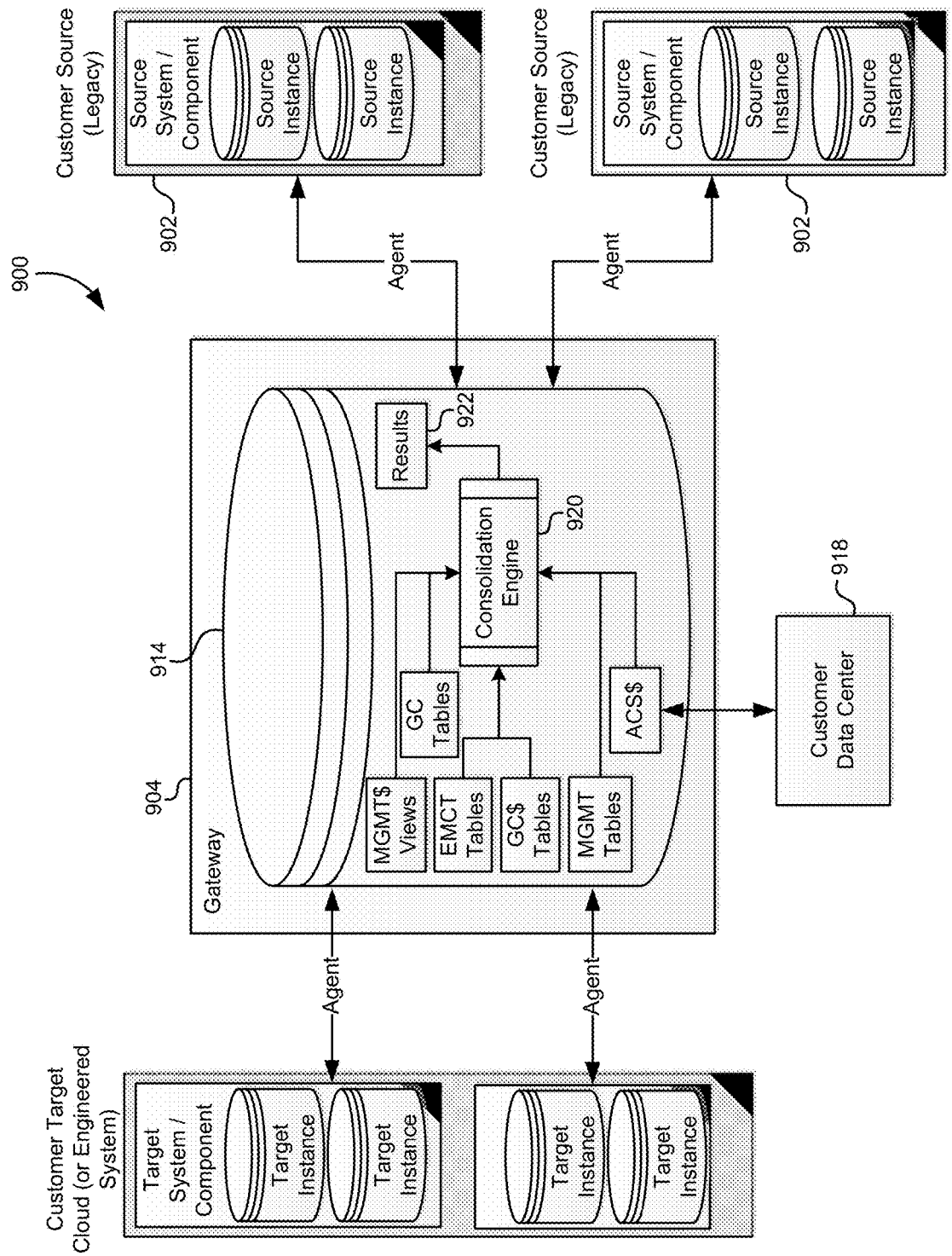
FIG. 9 illustrates a block diagram of a data storage architecture for modeling the migration of systems and/or system components, according to certain embodiments.

FIG. 9 illustrates a block diagram of a data storage architecture for modeling the migration of systems and/or system components, in accordance with certain embodiments. As described above, the gateway 904 may operate in an Enterprise Manager to record data that are relevant to migration and modeling during normal operations. The gateway 904 may include a data store 914 that is configured to store information associated with the performance of a set of legacy systems 902. The legacy systems 902 may include a large number of system components such as any one or combination of server(s), OS(s), mid-tier component(s), application(s), database(es), and/or the like. An agent installed on the legacy systems 902 may provide information to the gateway 904 that is stored in the data store 914. In some embodiments, the data store 914 may be populated continuously with data during normal operations of the legacy systems 902.

A consolidation engine 920 may read information from various tables in the data store 914, such as management tables, garbage collection tables, read/write logs, and/or the like. Note that this allows the consolidation engine 922 have historical performance data always on hand. Therefore, when a customer creates a migration scenario, the migration scenario can be modeled using historical data rather than needing to collect future data in order to complete the analysis. For example, data retrieved from the "MGMT$" tables can be crunched via the consolidation engine 920, and the results may be stored in 922 ready to be shipped back to the provider data center 918.

The consolidation engine 920 may extract the data from existing tables and fit the data into a new data model. In some embodiments, as the Enterprise Manager populates tables in the data store 914, the consolidation engine 920 may detect the changes and automatically use the data to populate the new data model. In some embodiments, the consolidation engine 920 may instead wait until a migration scenario is provided by a user before translating data from the old format into the new data model. The new data model may include data from many different databases within the data store 914.

Figure 10:
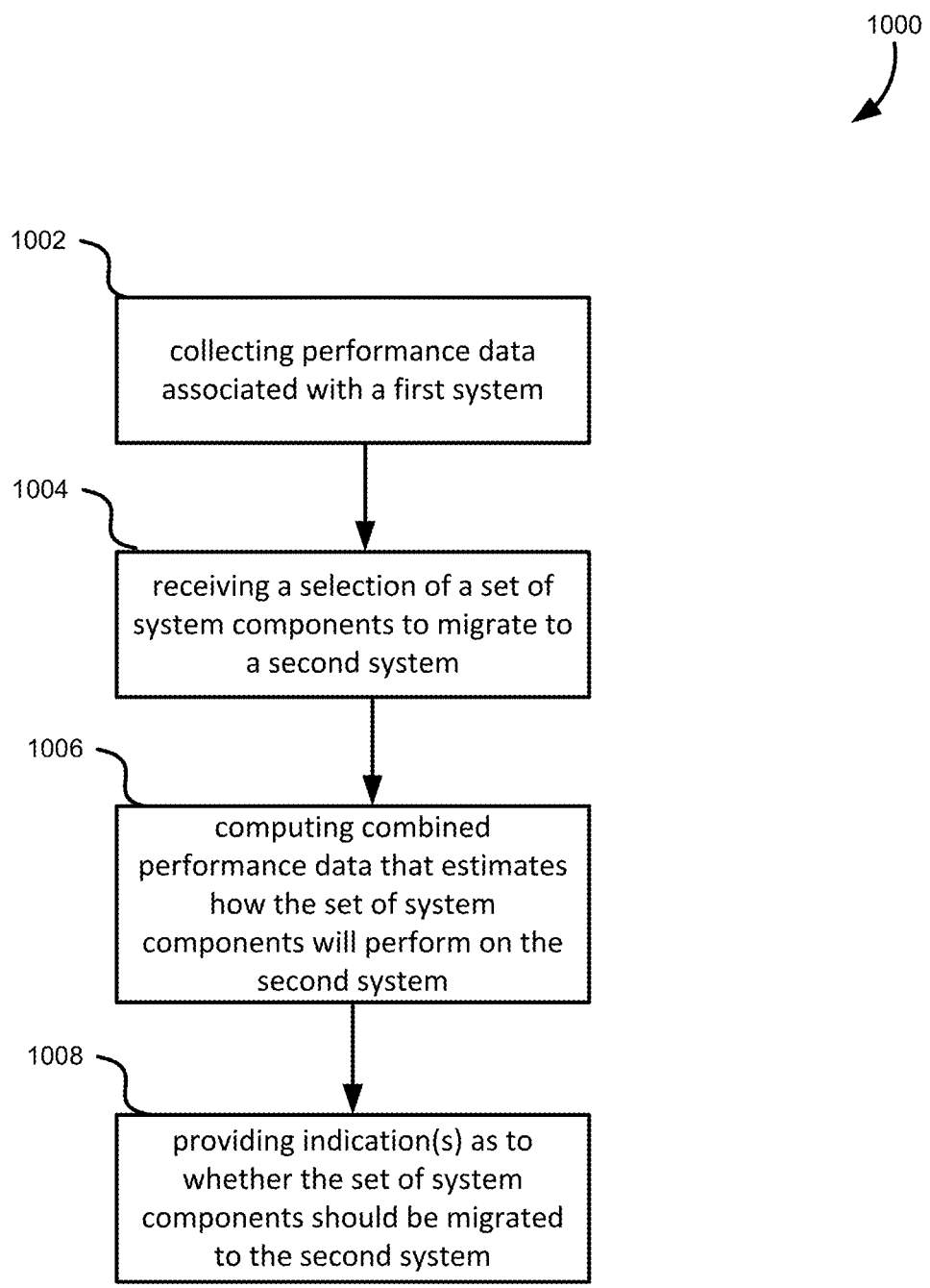
FIG. 10 illustrates a flowchart of a method of modeling prospective system migration between systems, in accordance with certain embodiments.

FIG. 10 illustrates a flowchart 1000 of a method of modeling prospective system migration between systems, in accordance with certain embodiments. As indicated by block 1002, the method may include collecting performance data associated with a first system. The first system may be comprised of a plurality of individual system components. The first system may be operated by a customer of a provider of one or more of the system components. The first system may be referred to as a legacy system and may comprise multiple individual system components such as any one or combination of server(s), OS(s), mid-tier component(s), application(s), database(es), and/or the like.

The performance data may be collected by a system agent installed on the first system. Performance data may be on a per-system basis and/or a per-component basis, such as a per-application basis. Performance data may include CPU usage (which may include peak usage over a particular harvest period) and memory usage (which may likewise include peak usage). Performance data may include different departments that use a system component, a version of a system component, information types stored within the system component, number of reads/writes on a system component, size of the system component, an encryption method used, a compression method used, security requirements, user groups, a status designating the criticality of a system component, acceptable downtimes, and/or other similar types of information. In some embodiments, the term performance data may also include data related to system component behavior and/or configurations. The agent may be configured to collect performance data that is relevant to system migration.

The performance data may be collected during the normal course of operations of the first system. In some embodiments, the collected performance data may be used to automatically populate analysis fields. The performance data may be collected by an Enterprise Manager and stored locally in a data store belonging to the customer. In some embodiments, the performance data may be collected from existing tables that are utilized by the Enterprise Manager. In some embodiments, these existing tables may utilize a first schema or data format that is compatible with a relational database manager of the first system. In some embodiments, the performance data may be transformed into a second schema or format that is used to model database migration scenarios.

The performance data collection may be carried out by a gateway that operates transparently on the customer system. The gateway may be communicatively coupled through the Internet to a cloud-based service that is remotely located geographically away from the first system. In some embodiments, the gateway may periodically transmit the performance data to the cloud-based service for performance analysis and diagnostic purposes.

Performance data may be collected over a time interval, then discarded as it becomes stale. For example, performance data may be collected for a time interval of approximately 1 weeks, 2 weeks, 3 weeks, 30 days, 80 days, 100 days, and/or the like. As the performance data becomes stale, it may be marked for deletion or garbage collection and/or replaced by new performance data that is more recent.

As indicated by block 1004, the method may also include receiving a selection of a set of system components to migrate to a second system. The second system may selected by the customer as a target for migration. For example, the first system, or legacy system may be nearing the end of its useful life. The customer may wish to migrate data stored in the first system into a new system that is more state-of-the-art. Some embodiments may allow a customer to design the second system from available components. For example, a customer may be presented with an interface that allows them to select hardware and/or software (such as an Exedata machine commercially available from Oracle®) and configured the selected hardware and/or software as desired for the second system. This may allow users to model various migration scenarios using different hardware and/or software platforms before purchasing or making other agreements associated with the second system.

In some embodiments, the portal described herein may be used to select or design a configuration for the second system. An operator of the cloud-based service and/or the portal may provide options for the second system through the portal. This may allow an entity to leverage the service of modeling prospective migrations in order to sell hardware and software configurations for the second system as the target of the migration.

The selection of the set of system components may be from a plurality of systems/components within the first system. In some cases, the set of system components may be a proper subset of the plurality of the system components in the first system, i.e., only some of the plurality of system components in the first system may be selected for migration. Similar to the process described above for selecting the second system, a portal may provide an interface through which a customer may select the set of system components from their existing legacy systems. For example, the portal may display current system components available for selection and allow a user to select one or more system components for migration.

In some embodiments, the migration scenario may involve migrating multiple system components to a single system component within the second system. For example, two or three legacy application systems may be migrated to a single target application system. The target application system may be equipped with more processing power, more storage space, and/or more advanced management software and algorithms that enable it to facilitate the data and operations of multiple legacy applications.

As indicated by block 1006, the method may further include computing combined performance data that estimates how the set of system components will perform on the second system. The combined performance data may be computed by the gateway on the customer's computing system. In other embodiments, the combined performance data may be computed remotely at a cloud-based service. For instance, after selecting the set of system components and the second system configuration in the portal, the portal may receive information from the customer's gateway needed to compute the combined performance data.

In some cases, the combined performance data may simply combine the performance data from each of the set of system components into an aggregate total. For example, combined performance data representing memory usage may comprise an aggregated total of the memory usage of each of the set of system components selected for migration. In another example, combined performance data representing usage (reads/writes) may also be an aggregate total of the usage from each of the set of system components selected for migration.

In other cases, the combined performance data may instead take advantage of synergies, redundancies, and/or other advantages that may be realized by combining data stored in the set of system components selected for migration. For example, the combination may eliminate redundant data and thereby reduce the total memory usage of the combined performance data. In another example, the combination may provide a greater yield for compression algorithms, thereby also reducing the combined memory usage.

It will be understood that the combined performance data may comprise information types other than raw metrics. For example, the combined performance data may include a designation that resolves the individual designations assigned to each of the set of system components selected for migration. For example, each of the set of system components may have a security designation associated with a set of security procedures and/or requirements. The combined performance data may comprise a security designation derived from the individual security designations from the source applications. Combining a high-security application with a low security application may result in a combined performance designation corresponding to high security.

In another example, the combined performance data may include a maximum amount of time during which the one or more system components may be unavailable. This may be referred to as a recovery time objective. Each of the set of system components selected for migration may include a distinct recovery time objective set, for example, by contractual obligation. The combined performance data may utilize the minimum, maximum, average, and/or any other arithmetic combination of individual recovery time objectives from the source system components to formulate a combined recovery time objective.

In another example, the combined performance data may include a maintenance window designation. Each of the set of system components selected for migration may be assigned an individual maintenance window during which the component can be off-line for migration. If multiple system components have similar maintenance windows, then the combined performance data may include a designation that indicates no maintenance window would exist, indicating to the customer that migrating the set of system components to the second system may require additional maintenance window scheduling.

In some embodiments, the performance data for one of the legacy system components may not be compatible with the performance data of another legacy system components. For example, hardware for a first application may use a processor that is incompatible with the hardware for a second application. Therefore, simply comparing processing times (often measured in reads/writes per second) may not be ideal. These embodiments may normalize performance data over the set of system components selected by for migration in order to generate the combined performance data. For example, standardizing benchmarks such as SPECint may be used to provide a normalized measure of computing power in the source system components as they would be combined in the target second system.

As indicated by block 1008, the method may additionally include providing one or more indications as to whether the set of system components should be migrated to the second system. The one or more indications may be presented in a fashion indicating that the system components can or cannot be merged. The one or more indications may communicate whether the set of system components should cohabitate on a single machine or set of resources, such as an engineered system. The one or more indications may also be presented in a graphical format that assigns a percentage or intermediate designation indicating that the system components can be merged, but that additional issues need to be considered. For example, one embodiment may use a green/yellow/red indication system where yellow indicates that some of the combined performance data reveals areas of possible concern for the customer.

In some embodiments, the one or more indications may be presented as a list through the portal described above that presents different categories of the combined performance data and a migration score assigned to each. Generally, the one or more indications may be divided into a group of quantitative components and a group of qualitative components. The group of quantitative components can describe whether the computing hardware of the second system can operate a combination of the set of system components selected for migration. These indications may be measured against a set of technical specifications or hardware capabilities of the second system. For example, one indication may provide the total memory usage of the combined set of system components as well as the available memory of a target system component along with an indicator as to whether or not the combined applications will fit on the target system. In another example, the processor usage of the combined system components may be compared to the available processing power of the target system component along with an indicator as to whether or not the target system component can handle the workload of the combined system components.

The group of qualitative components may indicate non-hardware/technical considerations in migrating the system component. For example, merging system component with different security requirements can be technically achieved by assigning the combined system components the highest security level from the source system components; however, enhancing the security of some data may not be desirable for business reasons. There also may be business reasons for keeping data separate and segregating employee lists that have access to each physical system component. Other qualitative components may include indications regarding maintenance windows, availability, data integrity and backup storage requirements, physical location requirements, compatibility with other legacy systems, and/or the like.

In some embodiments, the one or more indications may also include options that may be available to enable the migration or to minimize risks involved. For example, one of the indications may include a recommendation that the source system components perform a search for redundant data to be removed, and that by doing so the combined system components may physically fit on the target system component.

It should be appreciated that the specific steps illustrated in FIG. 10 provide particular methods of modeling a migration scenario according to various embodiments of the present invention. Other sequences of steps may also be performed according to alternative embodiments. For example, alternative embodiments of the present invention may perform the steps outlined above in a different order. Moreover, the individual steps illustrated in FIG. 10 may include multiple sub-steps that may be performed in various sequences as appropriate to the individual step. Furthermore, additional steps may be added or removed depending on the particular applications. One of ordinary skill in the art would recognize many variations, modifications, and alternatives.

The examples described above are not meant to be an exhaustive list of the types of quantitative and qualitative indications that may be of interest in modeling the prospective migration of system components. What follows is a description of several interfaces that may be provided by the portal. These interfaces may be used to walk a customer through a systems migration modeling process and provide the indications described above such that the customer can make a decision as to whether or not the migration should proceed. Again, these interfaces are merely exemplary and not meant to be limiting.

Figure 11:
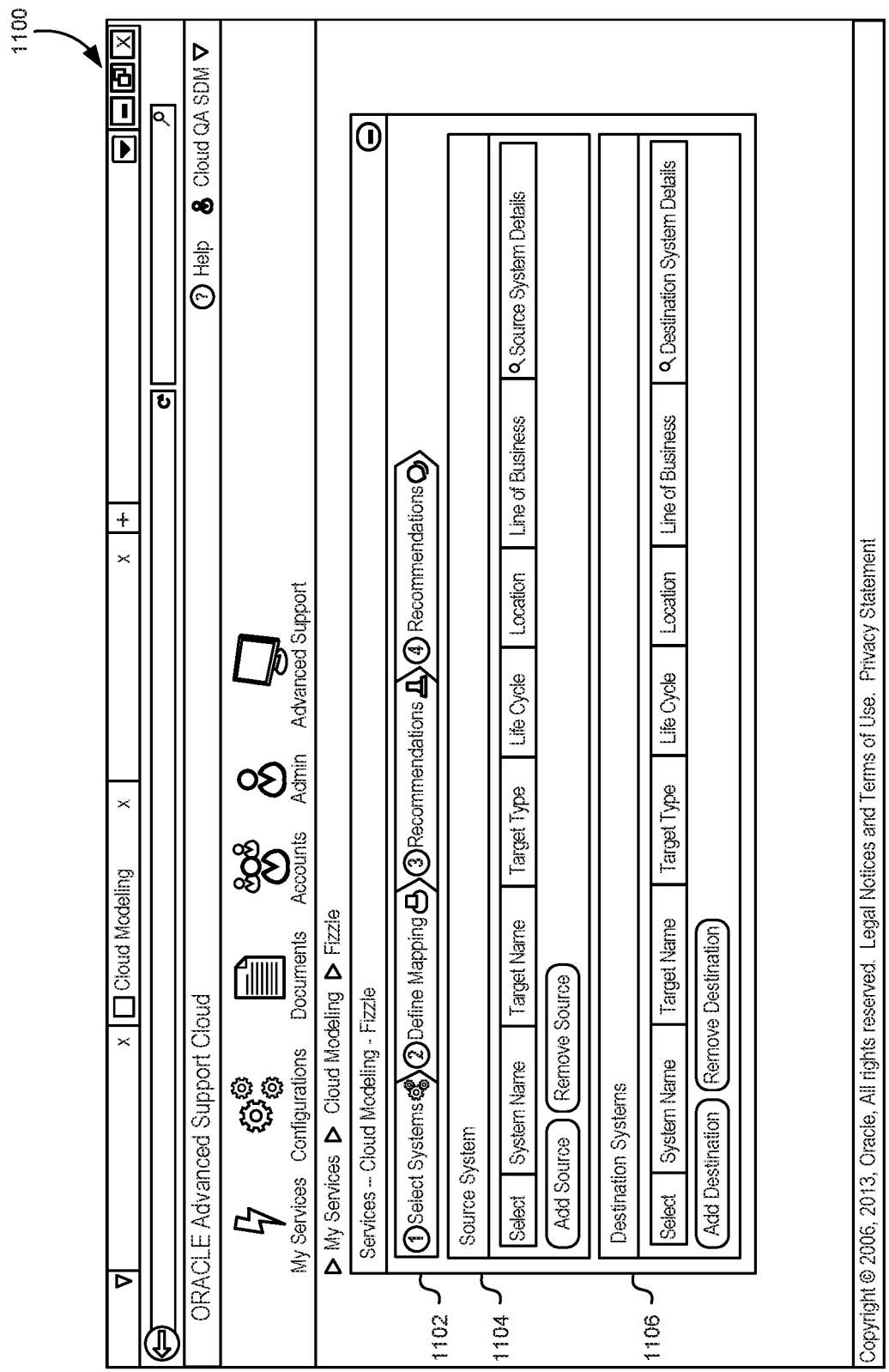
FIG. 11 illustrates an interface for selecting source and target systems/system components, according to some embodiments.

FIG. 11 illustrates an interface 1100 for selecting source and target systems/system components, according to some embodiments. The interface 1100 may be provided as a portal in a cloud support service as described above. Therefore, many services may be offered through the portal in addition to system modeling migration scenarios. Various services may be offered through a menu of interface 1100, and "Consolidation Planning Service" may be selected from among the available services. This selection may instruct the portal to retrieve performance data stored locally on the customer system by the gateway and to calculate combined performance data to be displayed through the portal for the customer to analyze.

Interface 1100 may include a progress bar 1102 that allows the user to see their progress made in relation to the entire modeling process. An initial step in the modeling process may be to select source and destination systems. A source selection control 1104 may be used to add and remove sources from the set of systems/system components selected for migration. Clicking the "Add Source" button may allow the customer to select existing systems that are registered through the portal. Similarly, a destination selection control 1106 may allow customer to add or remove destination hardware and/or software for the modeling process. For example, a user may select an engineered hardware system operated remotely via a cloud service. One or more legacy databases may be added as sources for data migration to a cloud-based storage service.

Figure 12:
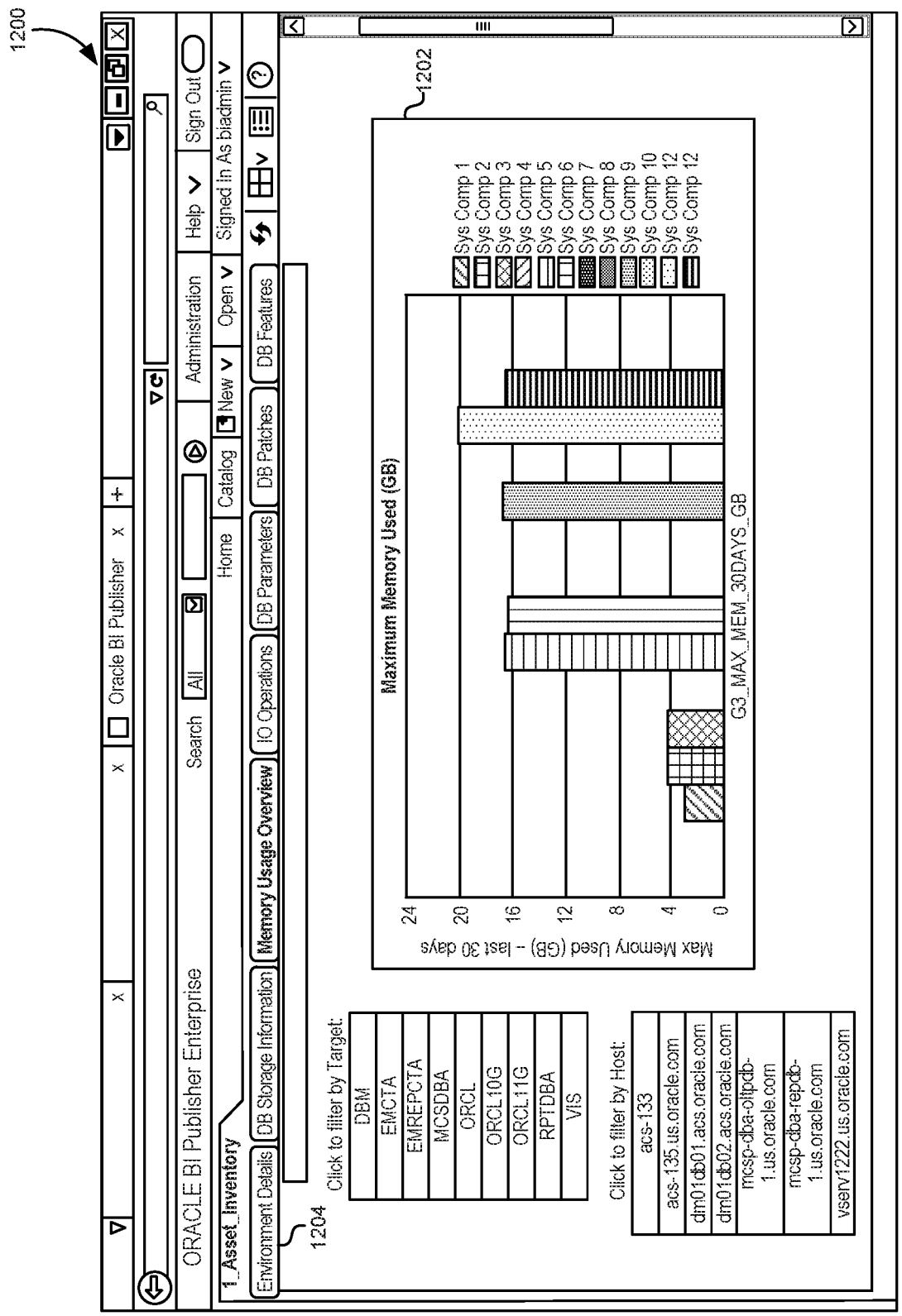
FIG. 12 illustrates an interface for analyzing the memory usage of a set of systems/system components selected for migration, according to some embodiments.

After selecting source and destination databases, the portal may next allow a customer to view and analyze the performance data that is associated with the source databases. FIG. 12 illustrates an interface 1200 for analyzing the memory usage of a set of systems/system components selected for migration, according to some embodiments. Interface 1200 includes a graph 1202 that shows the relative memory usage over the last 30 days of various selected system components. For example, the memory usage could be indicated on a per-server basis. If servers have virtual machines or zones running on them, the memory usage could be indicated on a per-virtual-machine basis or a per-zone basis. This type of interface may allow a user to determine which databases should be added and removed from the selection. For example, interface 1200 may reveal that one very large system component is included in the selection. The customer may remove the large system component in order to fit more smaller system components in the target system.

Memory usage is but one example of the performance data that may be viewed for the set of systems/system components selected for migration. A menu 1204 may allow the customer to select other types of performance data for the source systems/system components. For example, environmental details, storage information, systems/system components features, and/or other performance data may also be provided through interface 1100. The customer may select the tab associated with a desired set of performance data in order to view it through the portal.

In some embodiments, an interface for analyzing the I/O operations of the set of systems/system components selected for migration may be provided As with memory usage, such an interface may be available through one of the tabs at the top of interface. A graph may display the average number of physical reads and/or writes over a particular time interval, such as the past 30 days. Other types of graphs may show maximum values, minimum values, and/or other arithmetic measures of systems/system components reads and/or writes.

In some embodiments, an interface for analyzing the number of patches applied to the set of systems/system components selected for migration, according to some embodiments. Such an may include a graph that illustrates the relative number of critical patches applied to each of the systems/system components in the set. This information may help customers group systems/system components with similar patch counts together for migration to the same target systems/system components. Patch numbers may be correlated with an amount of maintenance required by each system/system component, and it may be advantageous to group systems that require similar amounts of maintenance.

Such interfaces as in the foregoing examples may all be used by the customer to analyze the performance data associated with each of the set of systems/system components selected for migration. The set of systems/system components selected for migration, as well as the target/second system/system component, may be collectively referred to as a migration scenario or a migration configuration. After viewing the performance data for the source systems/system components, the cloud-based portal may next provide interfaces for analyzing the combined performance data for a particular migration scenario to the target systems/system components.

Figure 13:
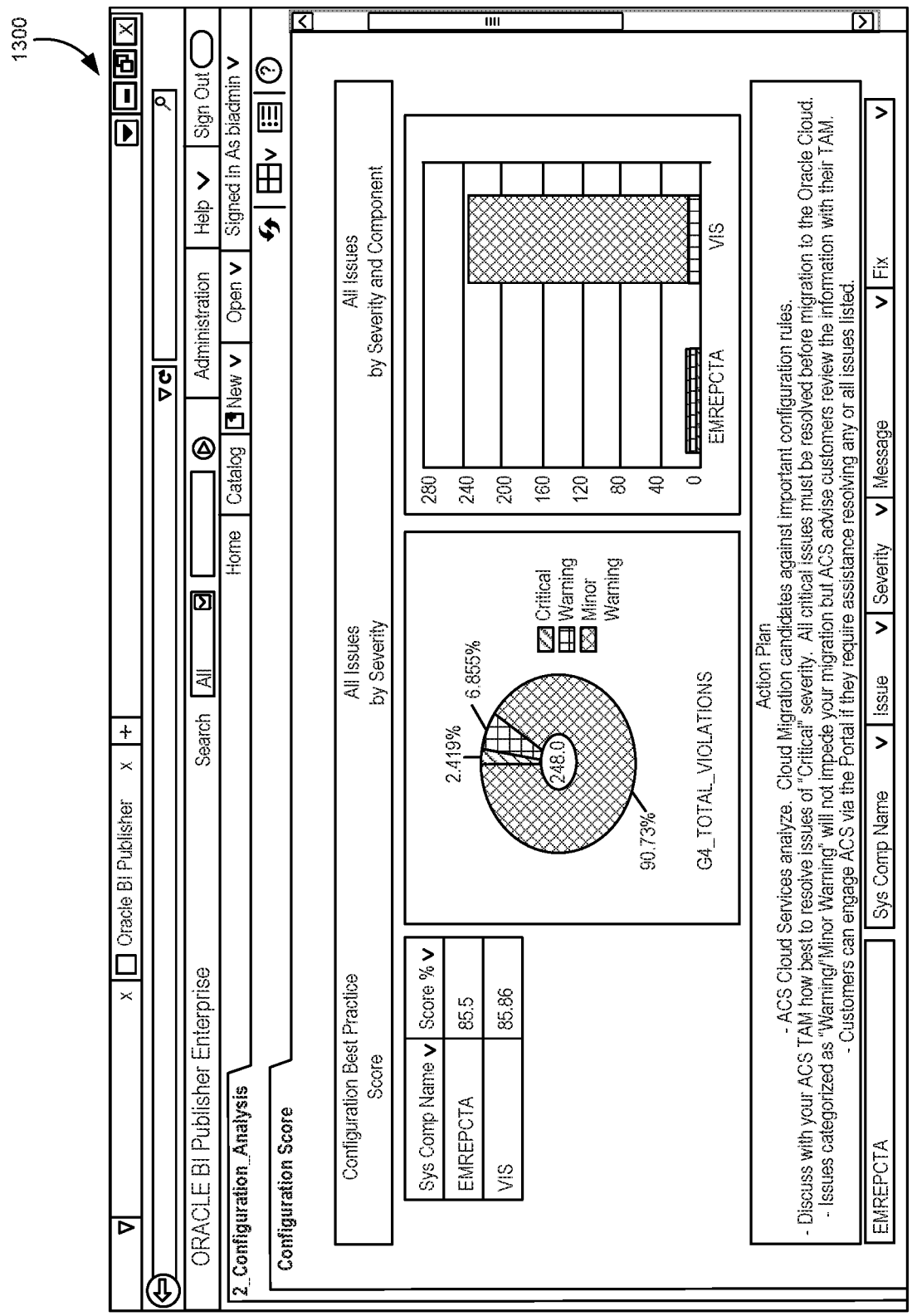
FIG. 13 illustrates an interface for configuration analysis, according to some embodiments.

FIG. 13 illustrates an interface 1300 for configuration analysis, according to some embodiments. Interface 1300 allows a user to determine if a system is configured in such a way that it would cause an issue for migration to the second system/system component. Various graphs, charts, tables, and other graphical elements may display critical issues, the severity of the issues, the number of issues, scores, compliance with business rules and other technical requirements, and/or the like. Interface 1300 may provide an overview for the customer to quickly analyze a migration scenario. From interface 1300, a customer may delve into the specific details of the combined performance data.

Figure 14:
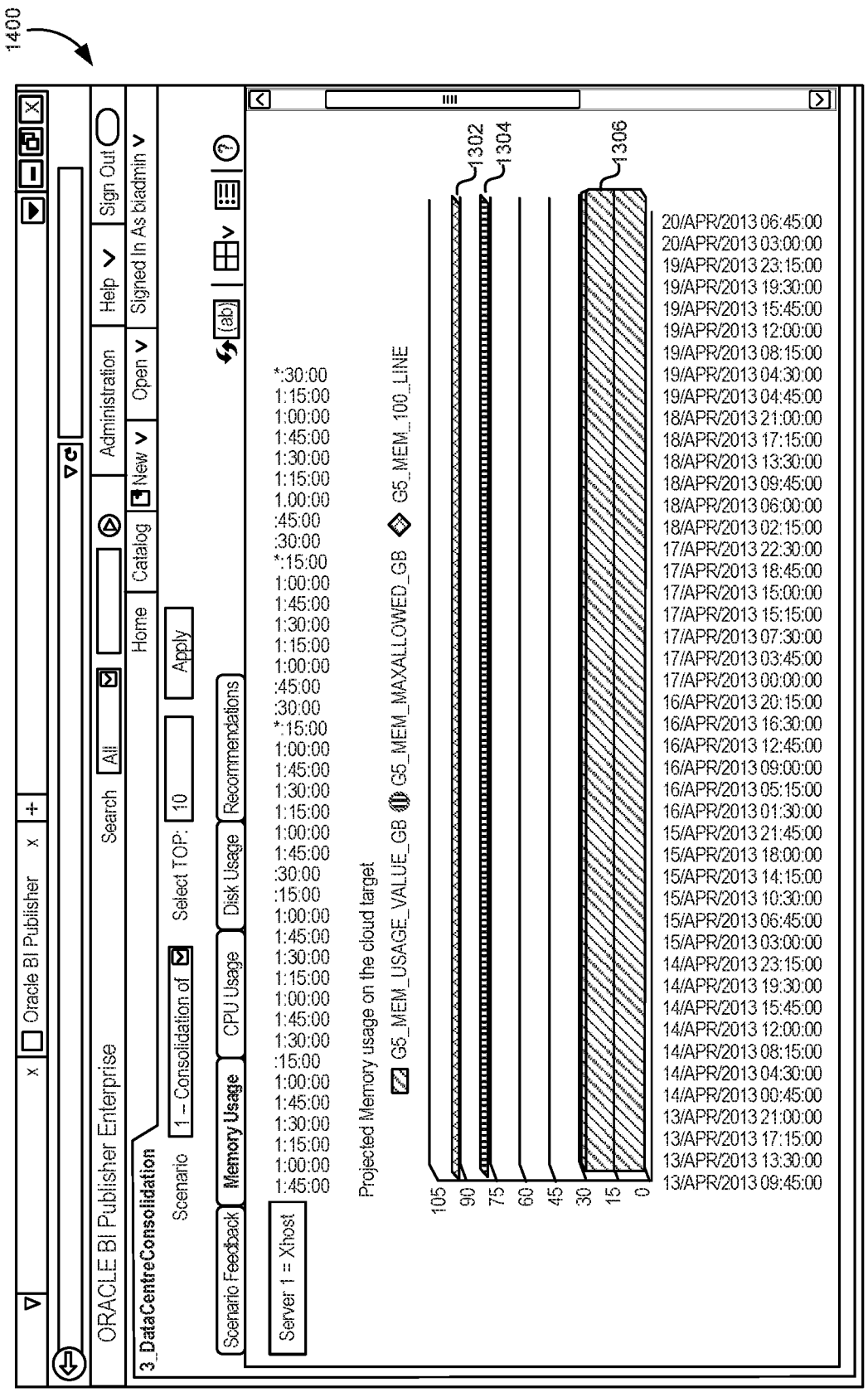
FIG. 14 illustrates an interface for analyzing memory usage on a target system, according to some embodiments.

FIG. 14 illustrates an interface 1400 for analyzing memory usage on a target system, according to some embodiments. The graph of interface 1400 illustrates the combined memory usage 1406 for two source servers after migration to the target server. Multiple thresholds may be used for evaluation. Threshold 1402 may be considered a hard threshold that memory usage is not allowed to exceed (100% in this case). Threshold 1404 may be considered a soft threshold indicating a desired maximum level of memory usage.

In the example illustrated by interface 1400, the combined memory usage 1406 does not exceed either threshold 1402 or threshold 1404. In some embodiments, if peak values of memory usage exceed threshold 1404, then a warning (e.g. yellow) may be presented in the one or more indications of whether the servers should be combined. Similarly, if the average value of memory usage exceeds a threshold 1404, then a critical error (e.g. red) may be presented in the one or more indications. In some embodiments, when the warning is indicated by a yellow color and a critical error is indicated by a red color, then no error may be indicated by a green color.

Figure 15:
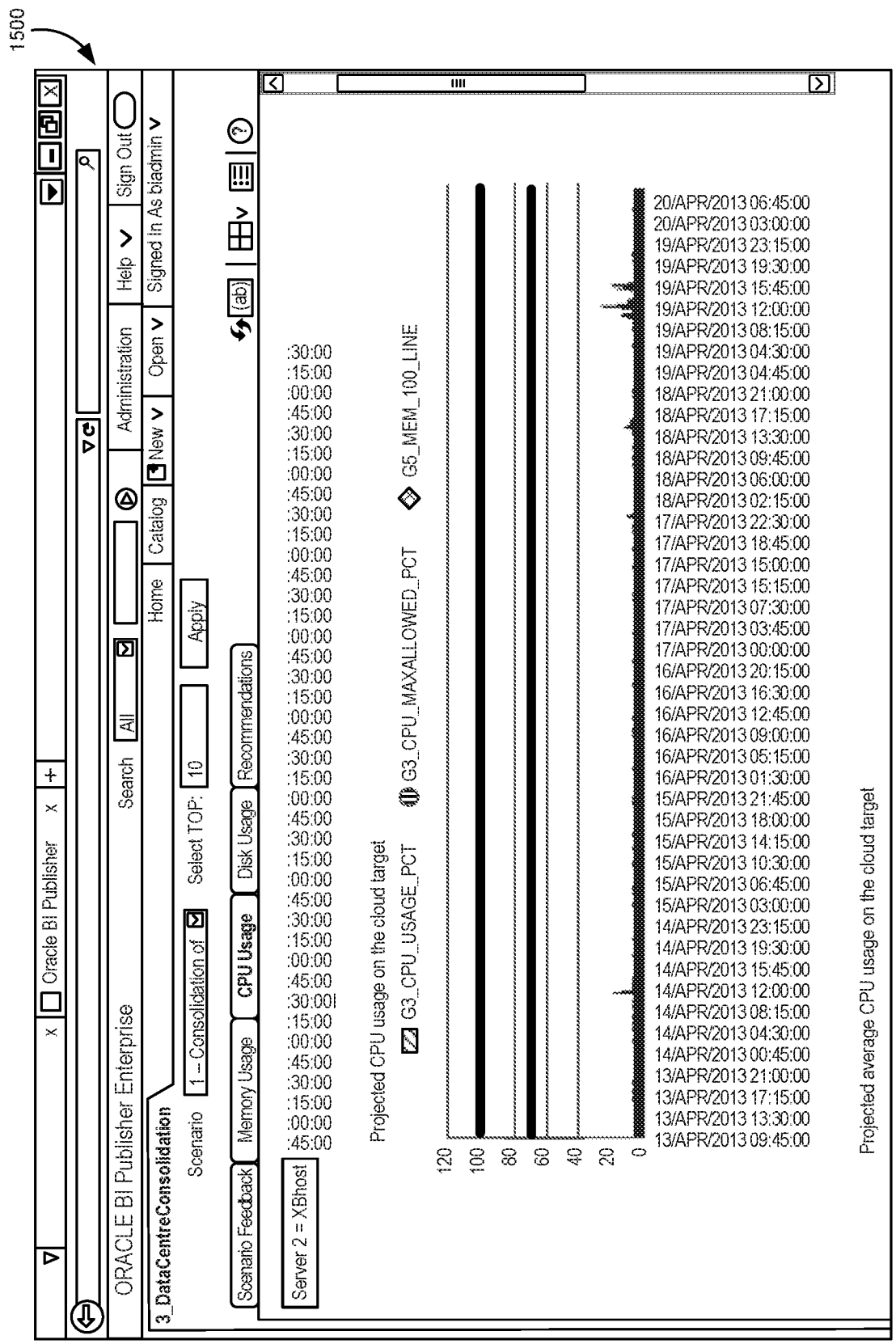
FIG. 15 illustrates an interface for analyzing CPU usage on a target system, according to some embodiments.

FIG. 15 illustrates an interface 1500 for analyzing CPU usage on a target system, according to some embodiments. Interface 1500 may be very similar to interface 1400. Both hard and soft thresholds may be used, and neither the peak value nor the average value of the CPU usage of the combined systems on the target system exceed the soft threshold. Warnings may be given for the values that exceed the soft threshold, and critical errors may be triggered for average values that exceed the soft threshold.

Figure 16:
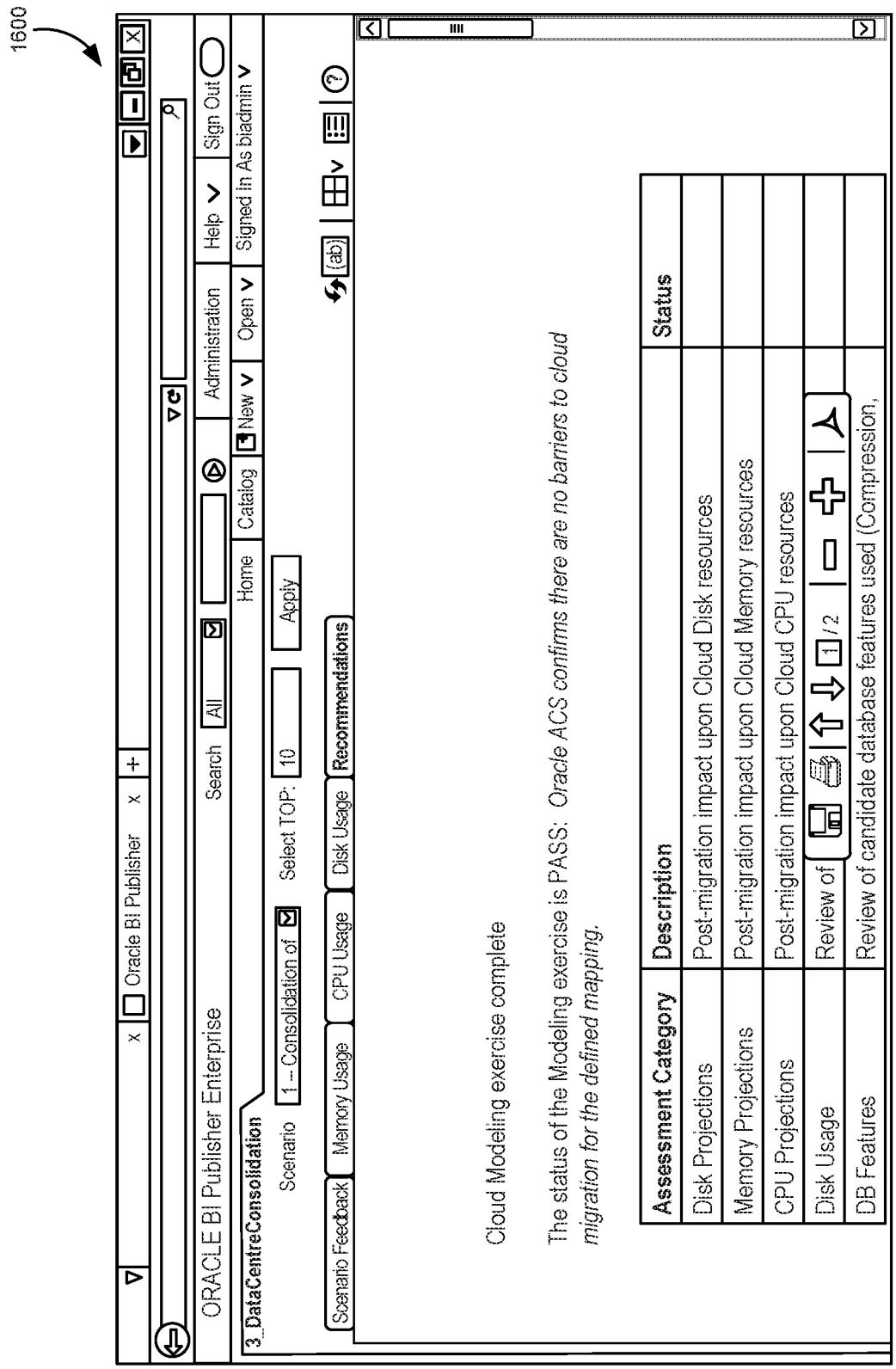
FIG. 16 illustrates an interface for recommending whether a migration scenario should be carried out, according to some embodiments.

FIG. 16 illustrates an interface 1600 for recommending whether a migration scenario should be carried out, according to some embodiments. The customer may be informed that the modeling exercise is completed. The customer may also be given a pass/fail/warning status of the modeling exercise. In this embodiment, each assessment category (disk projections, memory projections, CPU projections, disk usage, application features, etc.) has passed and is labeled with a green color. Therefore, the overall status of the modeling exercise is "PASS." Interface 1600 allows user to quickly make a determination about a migration scenario without needing to delve into the specifics of each assessment category.

Figure 17:
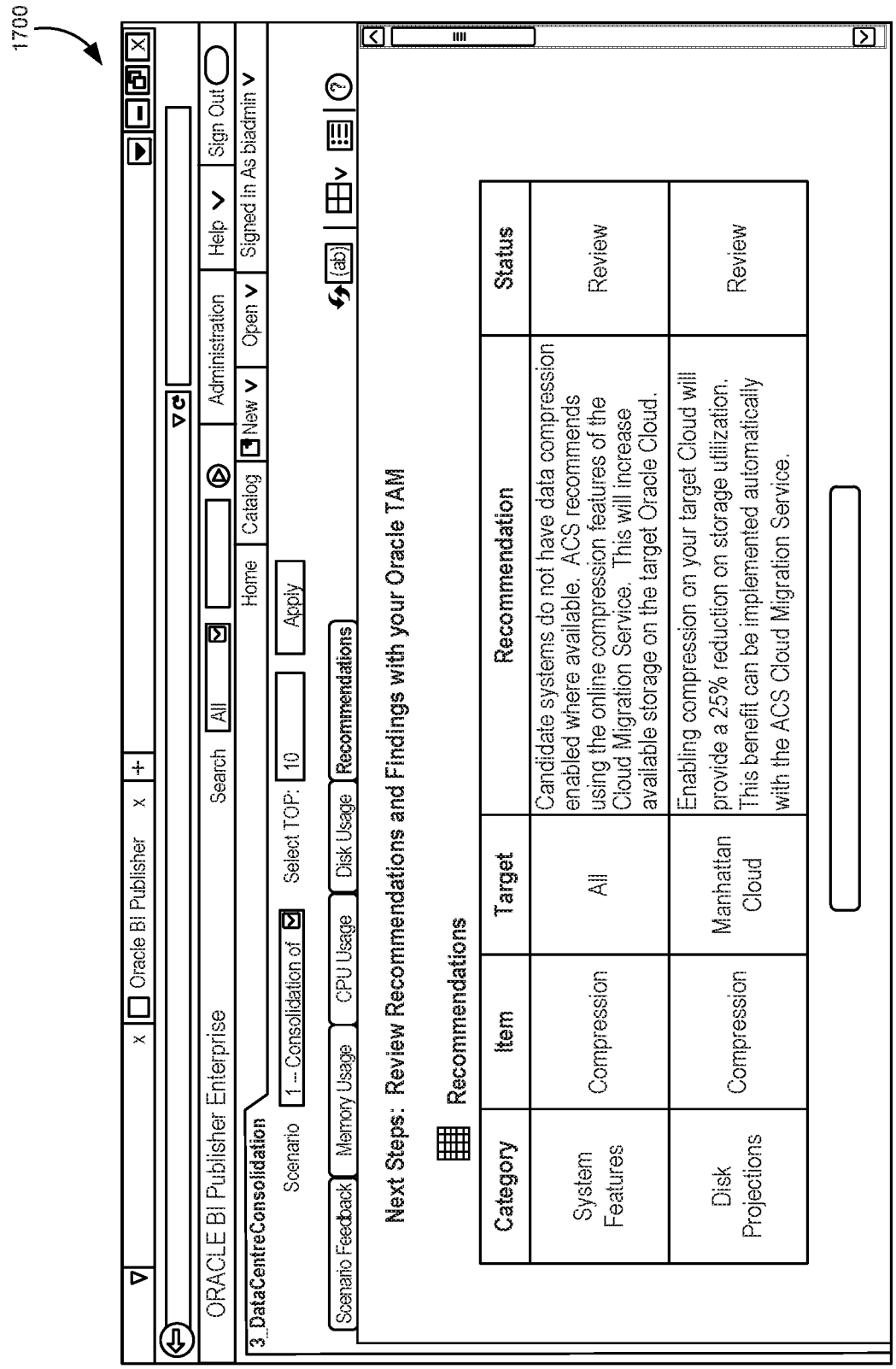
FIG. 17 illustrates an interface for providing recommendations for a migration scenario, according to some embodiments.

FIG. 17 illustrates an interface 1700 for providing recommendations for a migration scenario, according to some embodiments. Recommendations may be provided such that the performance of the target system will be improved. In cases where the migration scenario provided indications of critical errors or warnings, recommendations may be provided in order to mitigate the critical errors and/or warnings. In the example of interface 1700, a recommendation may inform the customer that data compression may improve the performance of one or more target systems.

In the foregoing description, interfaces were described covering certain aspects of a Consolidation Planning Service (Systems). It should be noted that other aspects of the Consolidation Planning Service may be provided in other interfaces that have not been described explicitly. For example, an interface may describe security reports related to a set of systems/system components selected for migration. Another interface might describe the availability of the set of systems/system components. Another interface might describe data integrity aspects of the set of systems/system components. Therefore, the interfaces presented herein are merely exemplary, and not meant to be limiting.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

What is claimed is:

1. A method of modeling a prospective systems migration between server systems, the method comprising:
   detecting, by a remote system, that a gateway is not yet installed on a first server system and, consequent to the detecting, initiating the gateway on the first server system at least in part to operate as a control point on the first server system that provides access and access security to a second server system and provides services to migrate applications from the first server system to the second server system;
   collecting, via the gateway operating on the first server system, performance data associated with a plurality of applications in the first server system;
   computing, by the gateway, using at least some of the performance data, combined performance data that estimates how a set of applications will perform on the second server system, wherein the computing the combined performance data comprises:
      deriving quantitative components attributed to the set of applications;
      deriving qualitative components attributed to the set of applications;
      wherein the qualitative components comprise a derived security designation derived from i) a first security designation attributed to a first application of the set of applications and ii) a second security designation attributed to a second application of the set of applications, where the first security designation is different from the second security designation;
   processing, by the gateway, the quantitative components and the qualitative components to determine whether each application of the set of applications should be migrated to the second server system based at least in part on the combined performance data;
   providing, by the remote system, indications as to whether each application of the set of applications should be migrated to the second server system, wherein the indications are based at least in part on the processing the quantitative components and the qualitative components, and comprise:
      a first indication that the first application can be migrated to the second server system; and
      a second indication that the second application cannot be migrated to the second server system; and
   consequent to providing the indications as to the set of applications, selecting, by the remote system, a particular service of a particular type from a library of different types of services and deploying and causing execution of the particular service of the particular type, by the gateway and with the provided access and the provided access security, to migrate at least one application of the set of applications to the second server system.

2. The method of claim 1, wherein the performance data is collected and stored prior to receiving the selection of the set of applications.

3. The method of claim 1, wherein:
   the performance data is collected by an application agent operating on the first server system; and
   the combined performance data is computed remotely from the first server system and the second server system, at a cloud-based service operated by a provider of the second server system.

4. The method of claim 1, wherein the set of applications corresponds to more than one server, and wherein the set of applications is to be migrated to a single server in the second server system.

5. The method of claim 1, wherein the indications comprise:
   a quantitative indication that describes whether computing hardware of the second server system can facilitate the set of applications according to a set of technical specifications; and
   a qualitative indication that describes whether the set of applications can operate together on the second server system according to a set of business rules.

6. The method of claim 1, wherein the indications comprise one or more selections from the group consisting of:
   a third indication that an average performance of a combination of the set of applications exceeds a threshold;
   a fourth indication that a peak performance of the combination of the set of applications exceeds the threshold; and
   a fifth indication that neither the peak performance and the average performance exceeds the threshold.

7. The method of claim 1, wherein the indications as to whether the set of applications should be migrated to the second server system are provided through a portal of a cloud service operated by a provider of the second server system.

8. The method of claim 1, wherein the indications comprise a combined storage space required by a combination of the set of applications in the second server system.

9. The method of claim 1, wherein the indications comprise a combined processor workload required by a combination of the set of applications in the second server system.

10. The method of claim 1, wherein the indications comprise:
   a third indication that a first application in the set of applications is associated with a first security level;

a fourth indication that a second application in the set of applications is associated with a second security level; and a fifth indication as to whether the first security level is compatible with the second security level.

11. A non-transitory, computer-readable storage medium having stored thereon instructions for modeling a prospective systems migration between server systems, which instructions, when executed by processors, cause:

detecting that a gateway is not yet installed on a first server system that is remote from at least one of the processors that are included in a remote system, and, consequent to the detecting, initiate the gateway on the first server system at least in part to operate as a control point on the first server system that provides access security, data security, and services to migrate applications from the first server system to a second server system;

collecting, via the gateway operating on the first server system, performance data associated with a plurality of applications in the first server system;

process a selection of a set of applications in the plurality of applications to migrate to a second server system;

computing, by the gateway, using at least some of the performance data, combined performance data that estimates how the set of applications will perform on the second server system, wherein the computing the combined performance data comprises:

deriving quantitative components attributed to the set of applications;

deriving qualitative components attributed to the set of applications;

wherein the qualitative components comprise a derived security designation derived from i) a first security designation attributed to a first application of the set of applications and ii) a second security designation attributed to a second application of the set of applications, where the first security designation is different from the second security designation;

processing, by the gateway, the quantitative components and the qualitative components to determine whether each application of the set of applications should be migrated to the second server system based at least in part on the combined performance data;

providing, by the remote system, indications as to whether each application of the set of applications should be migrated to the second server system, wherein the indications are based at least in part on the processing the quantitative components and the qualitative components, and comprise:

a first indication that the first application can be migrated to the second server system; and a second indication that the second application cannot be migrated to the second server system; and consequent to providing the indications as to the set of applications, selecting, by the remote system, a particular service of a particular type from a library of different types of services, and deploying and causing execution of the particular service of the particular type, by the gateway and with the provided access and the provided access security, to migrate at least one application of the set of applications to the second server system that is remote from the at least one of the processors.

12. The non-transitory, computer-readable storage medium of claim 11, wherein the performance data is collected and stored prior to receiving the selection of the set of applications.

13. The non-transitory, computer-readable storage medium of claim 11, wherein:

the performance data is collected by an application agent operating on the first server system; and the combined performance data is computed remotely from the first server system and the second server system, at a cloud-based service operated by a provider of the second server system.

14. The non-transitory, computer-readable storage medium of claim 11, wherein the set of applications corresponds to more than one server, and wherein the set of applications is to be migrated to a single server in the second server system.

15. The non-transitory, computer-readable storage medium of claim 11, wherein the indications comprise:

a quantitative component that describes whether computing hardware of the second server system can facilitate the set of applications according to a set of technical specifications; and a qualitative component that describes whether the set of applications can operate together on the second server system according to a set of business rules.

16. A system for modeling a prospective systems migration between server systems, comprising:

one or more processors, coupled to one or more network interfaces, to execute instructions to:

detect that a gateway is not yet installed on a first server system that is remote from the one or more processors and, consequent to the detecting, initiate the gateway on the first server system at least in part to operate as a control point on the first server system that provides access and access security to a second server system and provides services to migrate applications from the first server system to the second server system;

collect, via the gateway operating on the first server system, performance data associated with a plurality of applications in the first server system;

the gateway to execute instructions to:

compute, using at least some of the performance data, combined performance data that estimates how a set of applications will perform on the second server system, wherein the computing the combined performance data comprises:

deriving quantitative components attributed to the set of applications;

deriving qualitative components attributed to the set of applications;

wherein the qualitative components comprise a derived security designation derived from i) a first security designation attributed to a first application of the set of applications and ii) a second security designation attributed to a second application of the set of applications, where the first security designation is different from the second security designation; and process the quantitative components and the qualitative components to determine whether each application of the set of applications should be migrated to the second server system based at least in part on the combined performance data;

the one or more processors to further execute instructions to:
provide indications as to whether each application of the set of applications should be migrated to the second server system, wherein the indications are based at least in part on the processing the quantitative components and the qualitative components, and comprise:
a first indication that the first application can be migrated to the second server system; and
a second indication that the second application cannot be migrated to the second server system; and
consequent to providing the indications as to the set of applications, select a particular service of a particular type from a library of different types of services, and deploy and cause execution of the particular service of the particular type, by the gateway and with the provided access and the provided access security, migrate at least one application of the set of applications to the second server system that is remote from the one or more processors; and
one or more storage media coupled to the one or more processors to retain the instructions executed by the one or more processors.

17. The system of claim 16, wherein the performance data is collected and stored prior to receiving the selection of the set of applications.

18. The system of claim 16, wherein:
the performance data is collected by an application agent operating on the first server system; and
the combined performance data is computed remotely from the first server system and the second server system, at a cloud-based service operated by a provider of the second server system.

19. The system of claim 16, wherein the set of applications corresponds to more than one server, and wherein the set of applications is to be migrated to a single server in the second server system.

20. The system of claim 16, wherein the indications comprise:
a quantitative indication that describes whether computing hardware of the second server system can facilitate the set of applications according to a set of technical specifications; and
a qualitative indication that describes whether the set of applications can operate together on the second server system according to a set of business rules.

* * * * *

UNITED STATES PATENT AND TRADEMARK OFFICE
CERTIFICATE OF CORRECTION

PATENT NO. : 10,776,244 B2  
APPLICATION NO. : 13/938061  
DATED : September 15, 2020  
INVENTOR(S) : George Davis and Valentin N. Popa Page 1 of 1

It is certified that error appears in the above-identified patent and that said Letters Patent is hereby corrected as shown below:

On the Title Page

Item (56) References Cited / Other Publications

At Page 4, Column 1, Line 66, delete "No" and insert -- No. --

At Page 4, Column 2, Line 5, delete "131931,486" and insert -- 13/937,486 --

At Page 4, Column 2, Line 22, delete "23" and insert -- 28 --

At Page 4, Column 2, Line 35, delete "13,938,065" and insert -- 13/938,066 --

At Page 5, Column 2, Line 21, delete "Internationai" and insert -- International --

In the Specification

At Column 1, Line 34, delete "SERVICES ADVANCED" and insert -- SERVICES-ADVANCED --

At Column 2, Line 21, delete "Internationai" and insert -- International --

At Column 11, Line 3, delete "and or" and insert -- and/or --

At Column 11, Line 37, delete "and or" and insert -- and/or --

At Column 23, Line 43, delete "Exedata" and insert -- Exedata --

Signed and Sealed this  
Fifth Day of October, 2021

Drew Hirshfeld  
*Performing the Functions and Duties of the*  
*Under Secretary of Commerce for Intellectual Property and*  
*Director of the United States Patent and Trademark Office*